(12) United States Patent
Paturu

(10) Patent No.: US 10,807,681 B2
(45) Date of Patent: *Oct. 20, 2020

(54) FIRE-ESCAPE DEVICES OF THE OFF-SHORE RIGS WITH EMPHASIS ON A DETACHABLE ISLAND RIG

(71) Applicant: Sumathi Paturu, Birmingham, AL (US)

(72) Inventor: Sumathi Paturu, Birmingham, AL (US)

(73) Assignee: Paturu Sumathi, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/731,327

(22) Filed: May 25, 2017

(65) Prior Publication Data
US 2018/0339751 A1 Nov. 29, 2018

(51) Int. Cl.
*E21B 41/00* (2006.01)
*E21B 43/01* (2006.01)
*B63B 23/30* (2006.01)
*B63B 29/02* (2006.01)
*B63B 35/44* (2006.01)
(Continued)

(52) U.S. Cl.
CPC .............. *B63B 23/30* (2013.01); *B63B 29/02* (2013.01); *B63B 35/44* (2013.01); *E21B 41/0007* (2013.01); *G05D 1/0011* (2013.01); *B63B 2043/003* (2013.01); *E02B 17/00* (2013.01)

(58) Field of Classification Search
CPC . E21B 41/0007; E21B 43/0122; B63B 23/30; B63B 29/02; B63B 35/44; B63B 45/04; B63B 2713/00; G05D 1/0011
See application file for complete search history.

(56) References Cited

U.S. PATENT DOCUMENTS 4,356,789 A * 11/1982 Hammett ................ B63B 35/44
114/264
4,527,503 A * 7/1985 Connelly ................ B63B 23/00
114/264

(Continued)

FOREIGN PATENT DOCUMENTS

GB 2231844 A * 11/1990 ............. B63B 23/28

*Primary Examiner* — Matthew R Buck

(57) ABSTRACT

The invention encompasses fire-escape models of off-shore rigs with emphasis on a 'Detachable Island Rig' (DIR), the latter instantly unlocked upon a rig-fire from a permanent 'under-water basement', its 'water-sealed' fire-escape entry serving as an exceptional model ('Sumathi Paturu's 'in-situ' model') for an 'in-site' fire-escape of a jack-up rig. An 'off-site' modular is an unlimited air-source for all 'fire-escape' units. A guarded 'spray-room' is a destination for 'spray-walks', or 'spray-tracks' with 'track-drives', or else simpler 'spray-drives'—all being safe evacuation accessories workable with minimal cost and space. Wheeled 'life-boats' and 'lift-boats' protected against collision injury, are let out boarded/un-boarded by a remote control. Vital needs like safe evacuation, fresh air, and first-aids are devised as affirmed provisions. Other gas-fire protective outdoor/indoor measures include: 'gas-chasing' surface grid of fans and sprinklers about tall structures; similar grid 'arching' over the rig; and 'gas-chasing' pressured air-circuiting into the rig's interiors.

15 Claims, 11 Drawing Sheets

Figure 1:
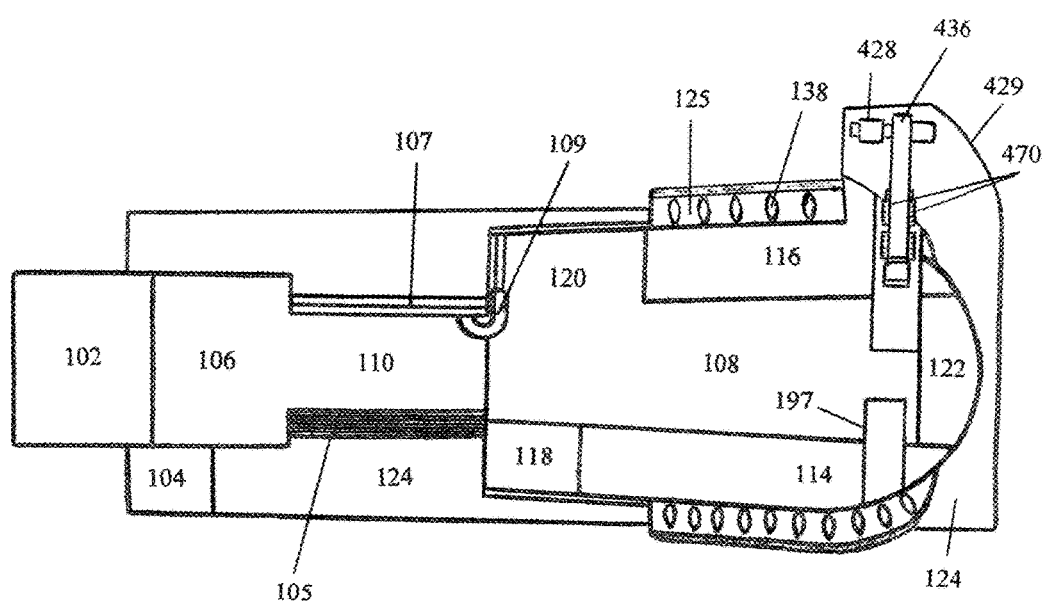

(51) Int. Cl.
*G05D 1/00* (2006.01)
*B63B 43/00* (2006.01)
*E02B 17/00* (2006.01)

(56) References Cited

U.S. PATENT DOCUMENTS

| | | | | |
|---|---|---|---|---|
| 4,781,144 | A * | 11/1988 | O'Brien | B63B 23/32 114/365 |
| 4,861,299 | A * | 8/1989 | Ueberschaer | B63C 9/00 114/365 |
| 5,078,073 | A * | 1/1992 | Betz | B63B 23/60 114/377 |
| 5,597,335 | A * | 1/1997 | Woodland | B63B 7/082 114/345 |
| 6,138,605 | A * | 10/2000 | O'Brien | B63B 23/32 114/365 |
| 6,510,808 | B1 * | 1/2003 | Tormålå | B63B 23/38 114/365 |
| 6,920,839 | B2 * | 7/2005 | Pelley | B63B 23/58 114/378 |
| 7,131,878 | B2 * | 11/2006 | Austevoll | B63B 27/36 441/80 |
| 7,223,142 | B1 * | 5/2007 | McDonough | B63C 9/26 441/80 |
| 8,347,804 | B2 * | 1/2013 | Van Loenhout | B63B 21/50 114/230.1 |
| 9,109,406 | B2 * | 8/2015 | Lammertink | E21B 15/02 |
| 9,884,669 | B2 * | 2/2018 | Paturu | B63B 23/30 |
| 2007/0051294 | A1 * | 3/2007 | Pike | B63B 23/00 114/348 |

* cited by examiner

FIRE-ESCAPE DEVICES OF THE OFF-SHORE RIGS WITH EMPHASIS ON A DETACHABLE ISLAND RIG

CROSS-REFERENCE TO RELATED APPLICATIONS

U.S. Pat. No. 9,175,549; TITLE: 'EMERGENCY SALVAGE OF A CRUMBLED OCEANIC OIL WELL' Jun. 6, 2011

U.S. Pat. No. 9,884,669; TITLE: 'EMERGENCY DETACHABLE ISLAND RIG AND FIRE ESCAPE' Nov. 3, 2015

STATEMENT REGARDING FEDERALLY SPONSORED RESEARCH: NOT FEDERALLY SPONSORED

THERE WAS/IS NO JOINT RESEARCH AGREEMENT OF ANY TYPE.

This is a Continuation-in-part application of U.S. Pat. No. 9,884,669 (as detailed above) which was a CIP application of U.S. Pat. No. 9,175,549.

BACKGROUND OF THE INVENTION

There are innumerable petroleum oil wells bored into the oceanic floor by highly evolved modern technological devices to tap the petroleum reservoirs. Many oil wells are clustered in the Gulf of Mexico, Arabian sea, and in such oceanic-grounds, often about significant distance from the coast line, such wells bored through the ocean floor as far deep as $\frac{1}{8}^{th}$ of a mile from the surface waters, to find their way into the underground oil containments, spread many miles in area. Oil is collected from the wells into surface tanks in moderate containers, or into receptacles as large as ships.

The drilling and production of petroleum oil from the earth's mantle about the ocean floor is shrouded in great hazard to the natural environment that includes both marine life forms and the terrestrial terrestrial ecosystem adjacent. The greatest hazard is the ignition of the entrained highly inflammable gases like Methane, causing dangerous fires, coupled with the risk of oil spewing and polluting the ocean waters. Such two man-made calamities at the same time can be uncontrollable with available resources, and utterly devastating to the healthy existence of the earth's planetary life forms. For these reasons, error-proof safety systems in under-water well digging, and highly trained personnel are required by law in all countries engaged in significant oil production. Despite that, catastrophic events are still occurring, as the derived remedial measures through each unique adverse event experience are still nascent and are less than perfect.

Recent event in the Gulf Shores of Mexico (involving BP Oil Company's Deep Water Horizon oil well), wherein the ignition of the entrained methane gas and its fire that continued for 36 hours, culminated in a collapse of the surface structure of the well, resulting in an ever increasing gusher from the source. Several attempts to contain the spewing geyser from finding its way into the body of water, and into the Gulf Shores had failed, due to the inherently limited robotic attempts, involved in a moderately deep aquatic habitat.

As any unforeseen adversity can happen at any time before the completion of the well to its last functional detail, safety measures to weather off such events have to be in place, before beginning to venture such operation. This CIP application enumerates different fire-escape devices of the off-shore rigs with emphasis on a 'Detachable Island Rig' (DIR). The 'Detachable Island Rig' is one among the diverse measures described in the parent application by the Inventor Applicant, said measures however working in synchrony, to weather off any unforeseen event throughout the well construction and well operation. For the information of the said devices otherwise operable, the original patented application (titled as 'Emergency Salvage of a Crumbled Oceanic Oil Well'; U.S. Pat. No. 9,175,549) may be consulted. The original application is also a parent application for yet another CIP application titled as 'Subsea Level Gas Separator of Oil Well Effluent', and its later CIP titled as 'Sea Level Gas Separator of Oil Well Effluent with Incorporated Emergency Measures upon a Well Blow Out' that enumerate the devised prototype models for dissipating a giant gas entrainment. The subject is contextually relevant, also preventive in scope, of otherwise catastrophic and devastating consequences of a rig-fire.

Many inadvertent and unforeseen consequences were/are inherent to such ventures as the deep sea explorations, shrouded in dangers and always counting on the tides of nature yet to be conquered by the technological sophistication. Accordingly, the Author Inventor is neither legally liable nor personally responsible for any 'adverse events' difficult to differentiate either as a mere association or as a consequence of the application of the structural and procedural information herein enumerated. Structural or procedural application of this disclosure in different situations, innumerable and unique, is a personal choice. Furthermore, analyzing and adapting swiftly to diverse and unforeseen situations still remain as the professional discretion and the deemed responsibility of the involved company and its technological associates participating in the day to day practice in the implementation of this invention, in part or as a whole.

Based on the cost of a rig, and the life of the personnel involved, even a major part of a permanent rig may be constructed as a detachable island from the conductor platform, the latter a possible inciting venue of a rig-fire. In all herein enumerated prototype models, utmost importance is given to vital needs thus far elusive, feared for the lack thereof, and yet herein accomplished with ease and affirmation.

BRIEF DESCRIPTION OF THE INVENTION

The invention delineates substantial accounts of the fire-escape models of off-shore rigs with emphasis on a 'Detachable Island Rig' (DIR) locked on a permanent 'under-water basement', to be instantly detached upon a rig fire, saving personnel as well as the property. A devised 'water-seal' about its basement's in-situ 'fire-escape entry', not to be destroyed upon a rig fire, serves as an exceptional fire-escape model within the confines of a rig. A fire-escape refuge is also devised as an 'off-site' modular, to be improvised with all types of rigs, including the DIR with a functionally intact basement fire-escape, said modular being a safe-guarded vital source of unlimited air-supply upon a rig-fire. An 'in-site' under-water fire-escape modular is herein devised with a 'water-sealed' fire-escape entry', for the most prevalent jack-up rigs also, with neither a basement, nor a provision for its elective structuring. In all models, a 'spray-room' (with needed accessories within and outside) guarding said 'fire-escape' entry, is devised to circumvent all known adversities. Utmost importance is given to long-felt vital needs like safe evacuation, food, and fresh air-supply, the latter about an unlimited time—these accomplished as affirmed provisions.

Not limited to the foregoing, the disclosure enumerates contextually significant life-boats and lift-boats, both with train-wagon wheels lowered by remote control into the ocean waters under fire-safe provisions, the boats further safe-guarded against collision injury. The disclosure further enumerates fire-safe means of 'spray-walks', or 'spray-tracks with track-drives', or else simpler means of 'spray-drives'—at least one among all being suitably operable about any rig setting, new or old, and about any catastrophic event and its consequences, to safely lead to the destination of the 'fire-escape' entry within a 'spray-room', the latter devisable easily for all types of off-shore rigs.

DRAWINGS

FIG. 1: 'A Plan of an Emergency Detachable Island Rig'—a schematic diagram of a workable outline.

Figure 2:
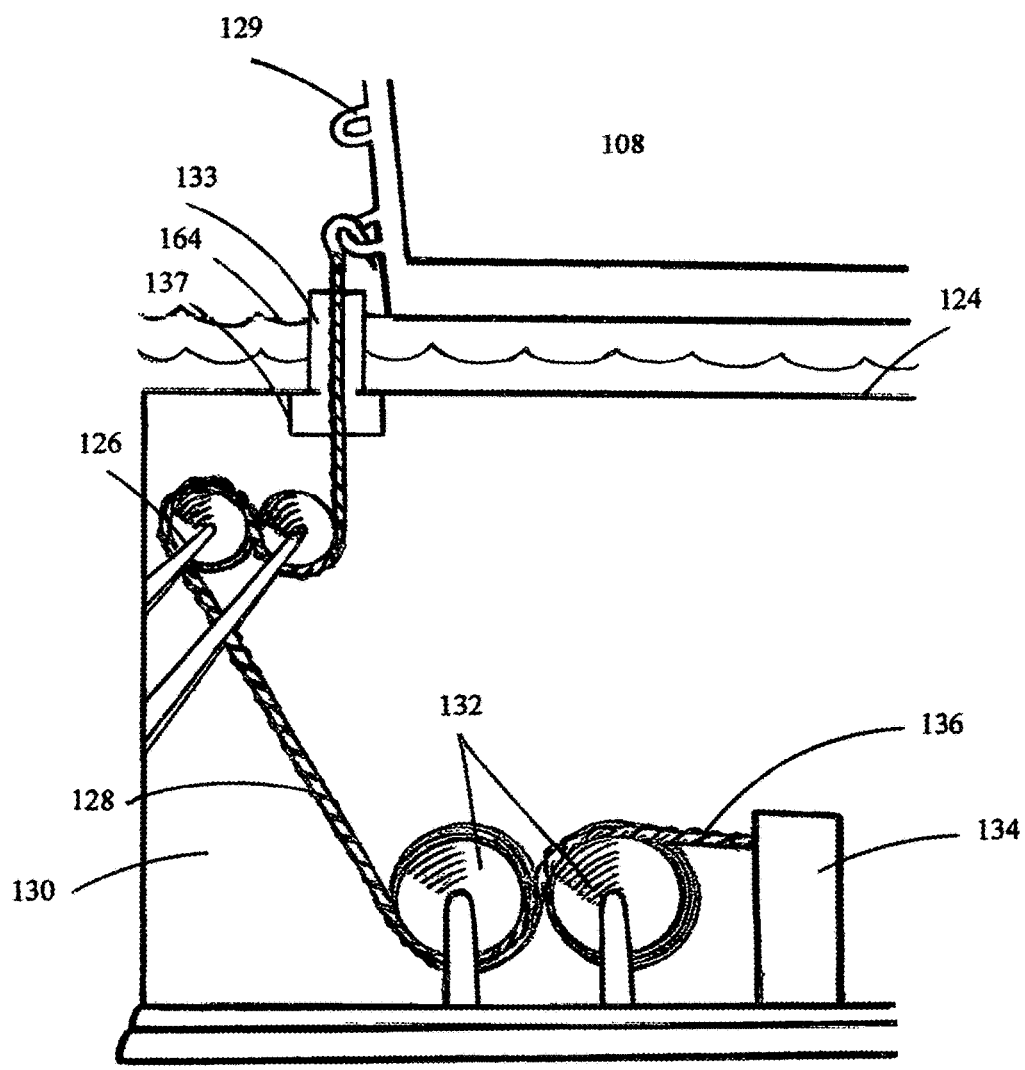

FIG. 2: 'An Anchoring Model of a Detachable Island Rig onto a Permanent Base Structure'—a schematic diagram.

FIG. 3A: A schematic of 'A Water-Sealed In-Situ Basement Entry Devised as an Emergency Fire-Escape in a Detachable Island Rig—a Holder Model'.

FIG. 3B: A schematic of 'A Water-Sealed In-Situ Basement Entry Devised for Storage Purposes in a Detachable Island Rig'.

Figure 4:
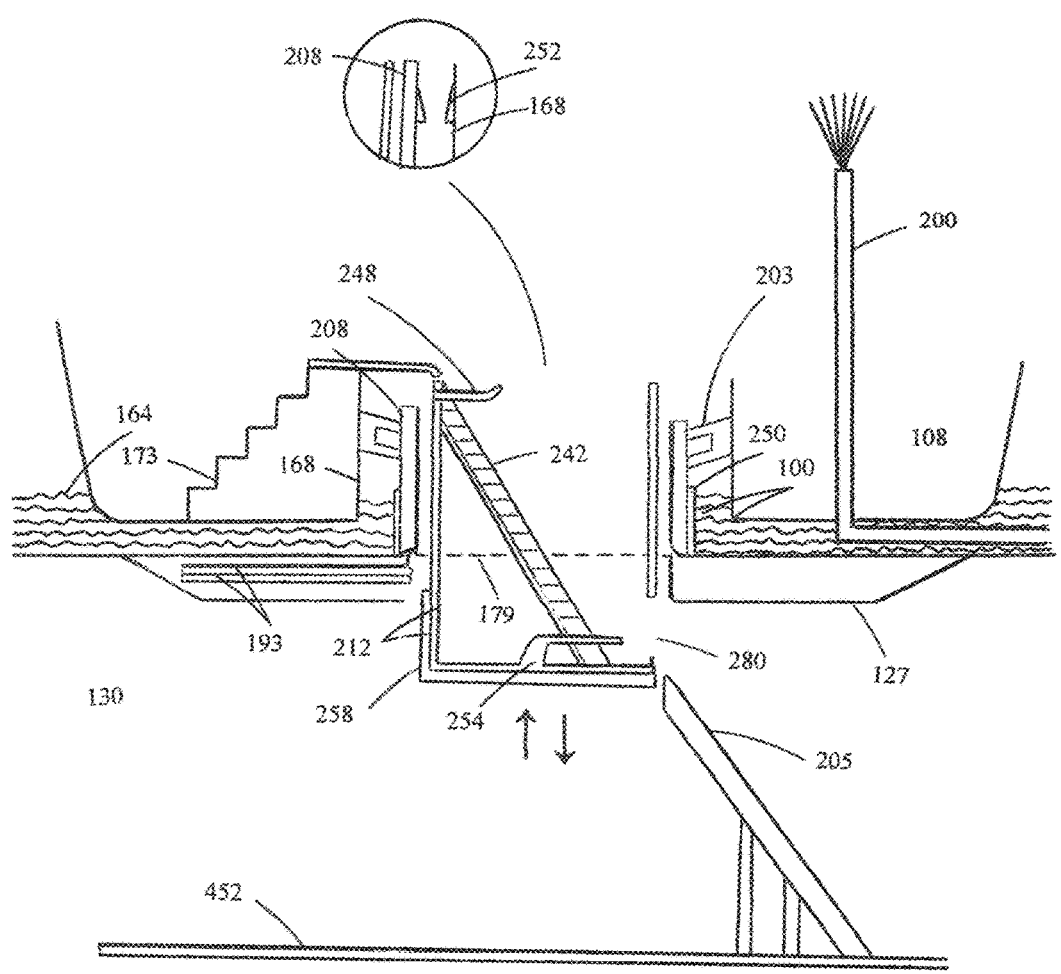

FIG. 4: A schematic of 'A Water-Sealed In-Situ Basement Entry Devised as an Emergency Fire-Escape in a Detachable Island Rig—A Moving Carrier Model'.

Figure 5:
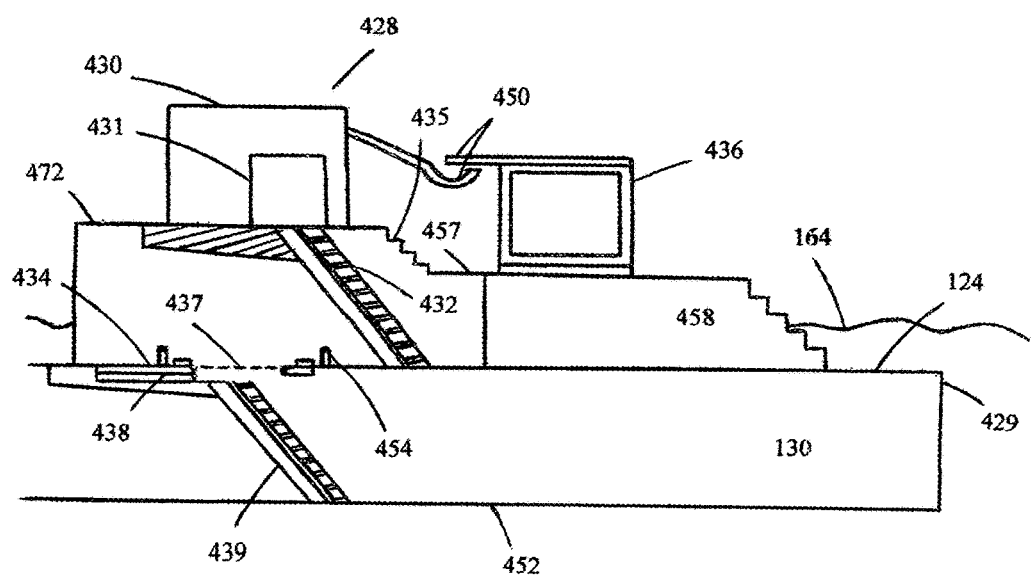

FIG. 5: 'A Water-Sealed Basement Access Devised for General Purpose Entry about a Detachable Island Rig'—a schematic model.

Figure 6:
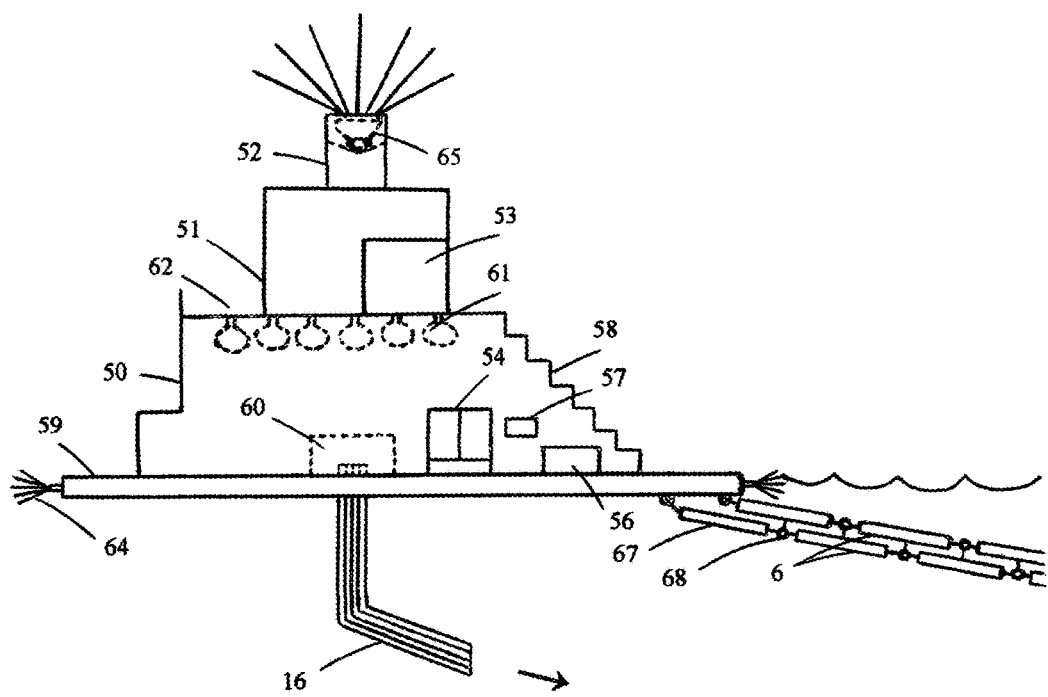

FIG. 6: 'An Off-site Fire-Escape Modular'—a schematic model.

Figure 7:
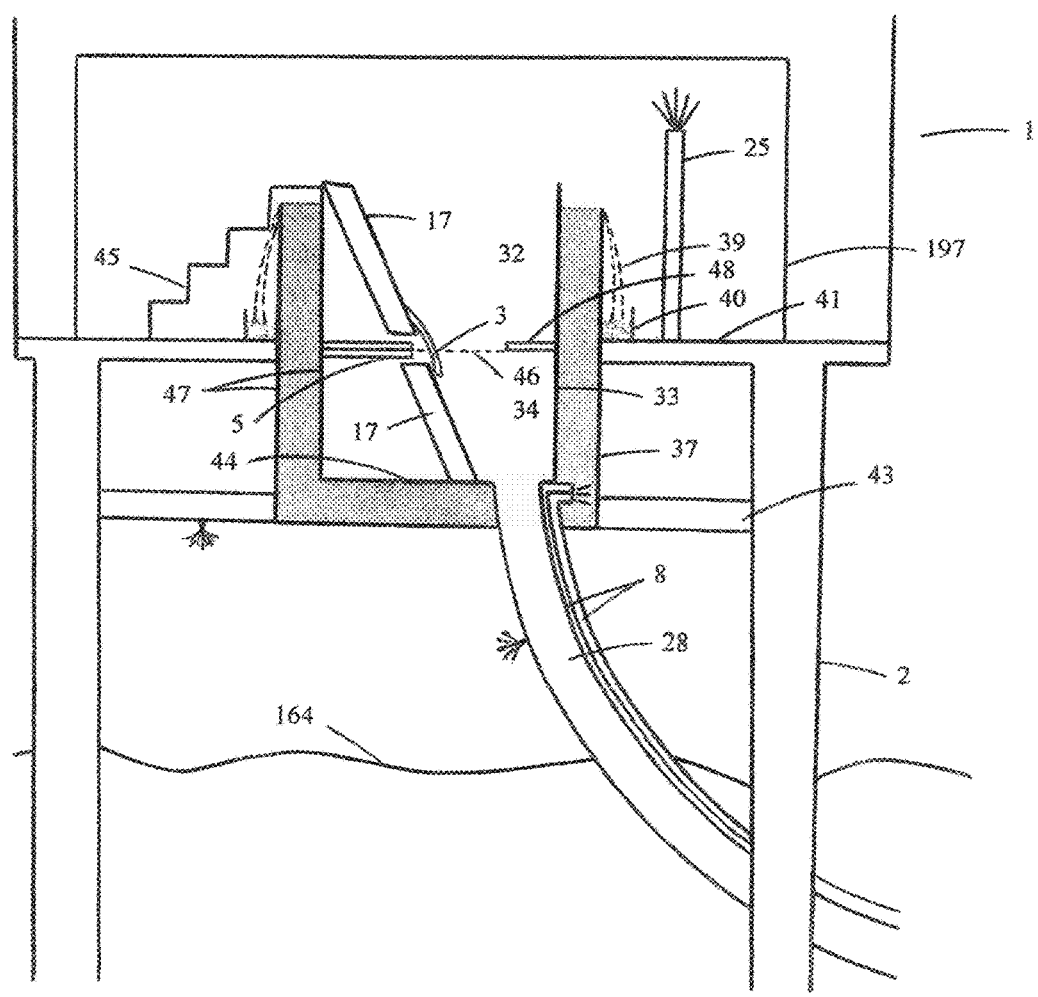

FIG. 7: 'A Water-Sealed Entry Structure of an In-Site Fire-Escape within a Jack-up Rig'—a schematic model.

Figure 8:
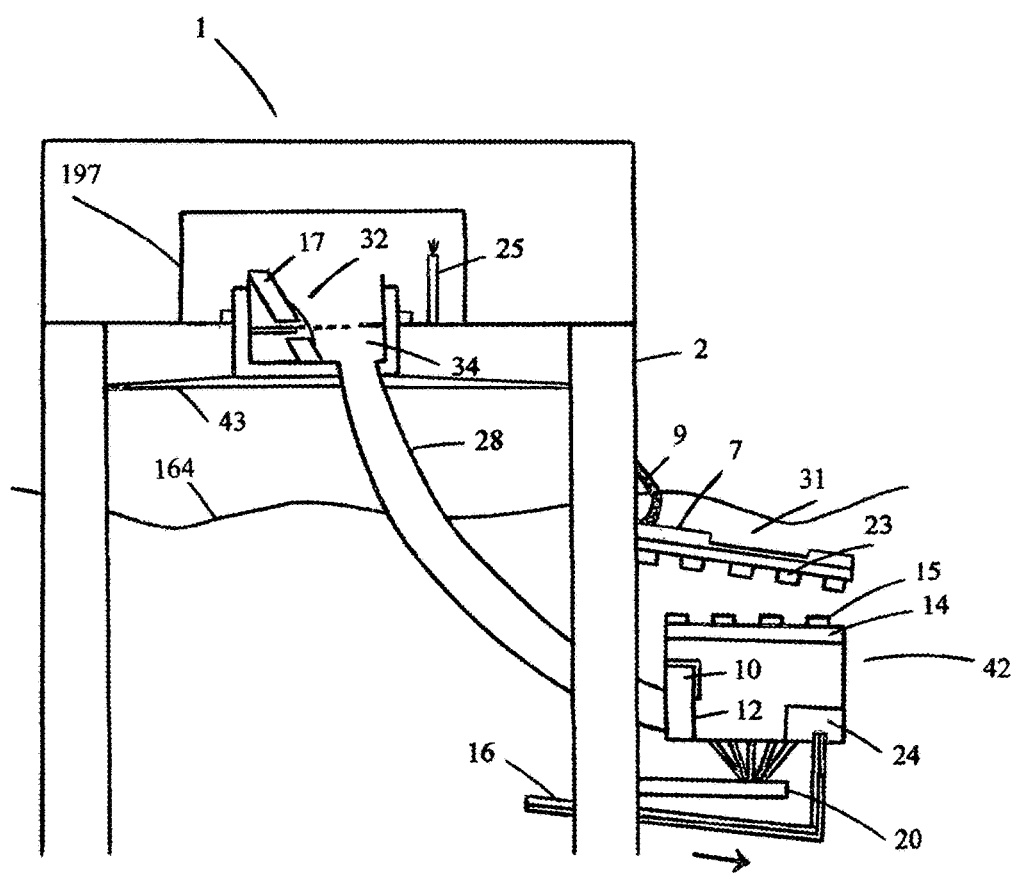

FIG. 8: 'An In-Site Under-Water Fire-Escape Modular Attached to a Jack-up Rig'—a schematic model.

Figure 9:
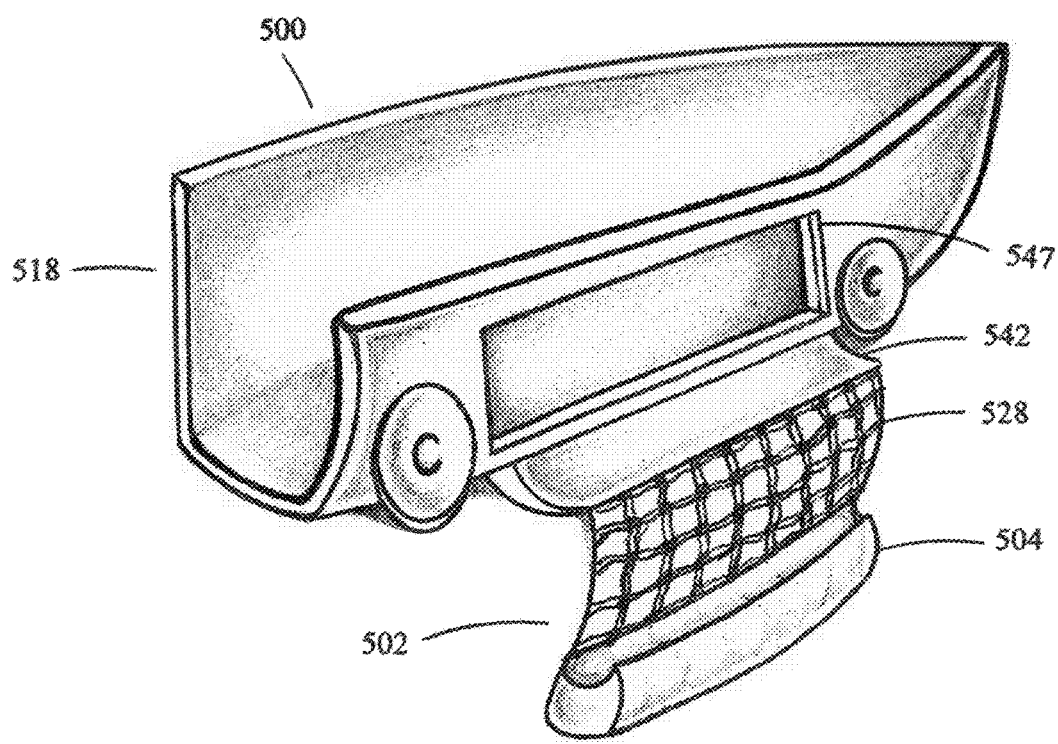
Figure 9:
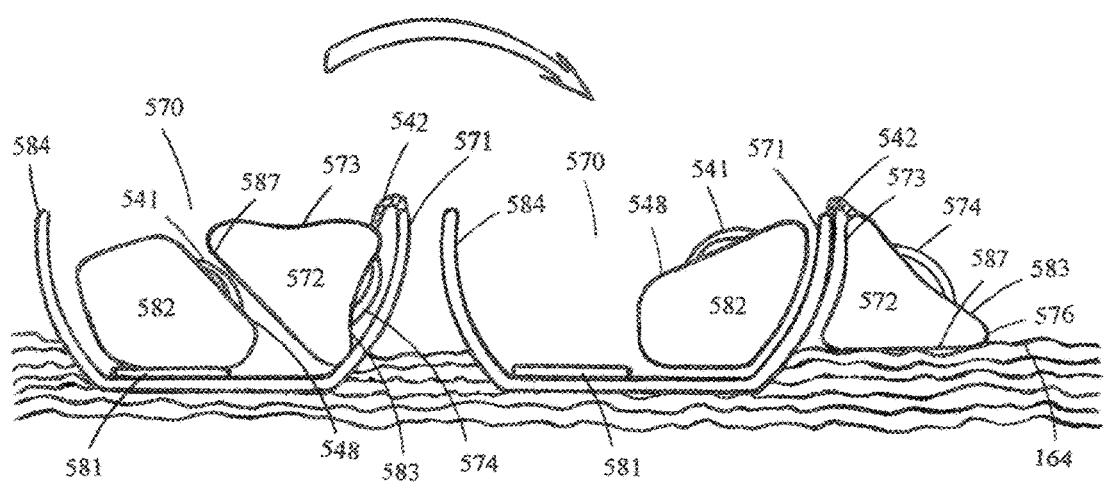

FIG. 9 A: 'A Hammock Design of a Lift-boat in an off-shore Rig'—a schematic, cut-section in part diagram.

FIG. 9 B: 'A Lift-boat in an off-shore Rig with an inflated lift-mattress'—a schematic, end-on vertical cut section diagram.

DETAILED DESCRIPTION OF THE INVENTION

The herein disclosed invention is directed to 'fire-escape' models of off-shore rigs that envisions an unique model of an emergency 'Detachable Island Rig' (DIR), the latter to be steered away by its designated crew upon an ignition fire of the stationary rig, salvaging the working amenities. The rig's permanent under-water basement, with a devised 'water seal', not to be destroyed upon a rig fire, is an instant 'fire-escape' for the rest of the crew, wherein its prototype 'water seal' serves as a 'schematic' of fire-escape model for the non-detachable rigs like the conventional jack-up rigs, with no built-in underwater basement.

It is a modern day irony that a rig-fire' is the greatest unsolved concern for the off-shore rigs, amidst ocean size of water. Probing into the historical events is herein deservingly warranted to delineate the problem, and design a solution that must be 'as a whole inquiry'. The most recent calamity in US territorial waters involving BP oil well happened before the 'Production Tubing' and the 'Production Packer' were installed, wherein the wide 'A' annulus acted as the tunnel for the gusher. The ocean water in turn quickly found its way into the oil containment through the expansive 'A' annular space of the well. It was worse due to the absence of the down hole safety valve (DHSV) placed in the 'Production Tubing' (the valve being the last resort thereof, to contain the leak from a disrupted well) as far below the surface as deemed safe, to be unaffected by a wipe out of the surface well head platform. In such instances as an uninstalled 'production tubing', yet, the well should have a provision, to let any forced emanations (a gas entrainment or an admixture with greater proportion of gases) to pass through a 'Sea Level Gas Separator of Oil Well Effluent' unit with Incorporated Emergency Measures upon a well blow-out' (the Inventor's yet another new invention, mentioned earlier) that dissipates the immensely pressured giant gas bubble. If that fails to contain wholly, and part of the gas bubble reaches the rig exploding into a rig-fire, the giant bubble being reduced to a meager size, the fire will not last incessantly feeding upon itself, as was the event about the gulf shores. The DIR must be steered away by the 'steering crew' from the source of continued danger. All the unfailing measures herein put together should minimize the fire, as also the rest of the crew swiftly gets into the underwater fire-escape refuge of the rig. In a desolate oceanic habitat with limited off-shore provisions, simpler the methods are, lesser are the unforeseen and 'difficult to circumvent' situations—a pervasive notion herein resonates, be it an abstract thought or a statutory subject matter, either deemed to succeed.

In the prevailing oceanic climate of the oil wells, after a bore well structure is disrupted, the ocean water continuously gets into the oil well and therefrom into the oil-containment, whereas the oil rises to the surface, because of their relative densities, that could be contributing to the spewing gush at a later time, while it would be a mere spill to start with. As the ocean water fills the underground oil containment, its pressure rises more and more in a short time, forcing the lesser dense oil to rise into the ocean like an eruption. Accordingly, it is imperative that immediate action be taken to stop the ocean water pouring into the oil containment, dampening its rising pressure, so breaking a brewing cycle. It is thereby obvious that the preservation of a functional rig is imperative for the needed emergency measures to plug the well leakage at the earliest possible instance when the leak is merely a spill, the same a formidable job, later on.

Ground stability can be a factor in opting for a permanent base. In the model herein described, the Detachable Island Rig is an immovable structure with ground stability, yet with provision to steer away from the base and the adjacent conduction platform (a site of the initial fire). In view of the crew, the ultimate destruction in the Deep Water Horizon Oil Well explosion is terrifying and demoralizing. Whatever can be salvaged should be salvaged including all personnel in one pack, working to distance from the source of fire, soon to be turning into a raging inferno. The following details are more than an introduction about the scope of the devised DIR, so that its incorporation into a rig can be affirmatively contemplated for what can be stated as one of its best assets—its ability to serve as an 'in-situ' fire-escape that is 'water-sealed' upon a rig-fire.

The Schematic of a Detachable Island Rig

FIG. 1 shows a schematic outline of an oceanic rig that includes a 'Detachable Island Rig' (DIR) in its structuring.

On one end of the rig is a conduction platform 102 that includes an appendage of fire station 104 (with its assigned crew). An adjacent segment 106 stations structures for the immediate operations of the conduction platform 102, the segment 106 connected to the Detachable Island Rig 108 by a stretch of fire-resistant corridor 110, sufficiently long. The foregoing structures numbered as 102, 104, 106 and 110 are the rig's permanently based structures. The tubing 107 and electrical wiring 105 running to the DIR traverse on either side of the corridor 110. The metal tubing 107 are substituted by short segments of rubber tubing 109 at the junction of the corridor 110 and the DIR 108. The DIR detachable from the fire-resistant corridor houses costly and heavy equipment, immediate supplies, work area 114 (having remote controls to the conduction platform, well head, and functional and security devices), living quarters 116, and a 'security monitoring and response station' 120. The separation of the DIR through the fire-resistant corridor 110 gives few minutes time for the DIR 108 to be steered away from the inciting area of danger. The DIR 108 also accommodates a fire station 118 (with its own crew) and a 'steering station' with a powerful engine, positioned about the farthest end 122, its functional design similar to a small ship in its scope of operations.

The DIR 108 as a whole is on a concrete/steel roof platform 124 of a basement, the latter totally submerged in water, and behaves like a permanent base, configured on structures (legs) erected from the sea floor. The DIR being reversibly locked to the base platform 124, it is partially submerged. It is most suitable if any structure is designed to be easily dismantled, to be arranged to a different configuration during restructuring. The DIR 108 also includes basement entry, structured in a 'spray room' 197 nearer to the steering station (about the farthest end 122), and accessible to the work area 114. The areas represented by the numerals 102, 104, 106, and 110 are located at a higher level (upon the roof platform 124) as the DIR itself, and the fire-resistant corridor 110 is connected to the DIR by a short watertight detachable walkway (not shown in the FIG. 1), and it is shut off on the side of the corridor 110 by a watertight closure when the DIR needs to be detached, as the DIR's own watertight closure is also shut off. The schematic FIG. 1 only shows the possible plan of the DIR, and does not precisely represent the true shapes, exact dimensions, or the operative configuration of an off-shore rig, as it is only intended to show a workable outline by which the detachment of the DIR 108 is easily accomplished, and how the structural arrangement should be geared towards that goal. It may possibly involve a deliberate redesigning of the new rigs, and remodeling of the old rigs, if the latter is feasible.

It should not be a concern that the open working platforms of the DIR 108 may be drenched by giant waves. As in a ship, such open platforms are sufficiently high from the ocean surface, and they get wet only as much as a ship gets wet. The platform can be made as high as desired, but such height also dictating the distance away from the basement's fire-escape, to be traversed during an emergency, which however can be amicably planned, as is outlined later. The rig about its periphery, may have weather resistant plastic shielding with metal support rods in equidistance, inclined towards the ocean. The shielding can have zippered window openings, kept open for a fresh breeze. They are of minimal investment, but offer the highly desired work area cleanliness and comfort. If subject to fire, the burnt plastic shielding quickly drops into the ocean.

The model of double pulleys—the base platform 124 of the rig is so structured that it is at a sufficiently low level from the water surface to remain underwater even by falling surface tides, and the island rig 108 is steered down onto it, to be immovably locked in a desired position. To that effect, suitable mechanical forces should be in place to overcome the built-in buoyant forces of the DIR, and bring it down by few inches. A device of double pulleys 126 shown in FIG. 2, positioned in equidistance about the side walls within the basement 130, is designed to maneuver a set of sliding metal/steel ropes 128, their upper ends hooked to the ringed structures 129 on the sides of the DIR. Additional rings, at times better operable, are positioned at higher levels. Traction on the steel ropes 128 by all pulleys 126 simultaneously will bring down the DIR 108. The grooves of the pulleys are covered (not shown in FIG. 2) so as the ropes 128 never get de-grooved. All the ringed structures 129 also have circled non-metallic ropes affixed, as occasionally they work better in maneuvering the DM 108 onto the base platform 124.

The roof tubulars—the model of pulleys described needs a suitable structuring that is operable for an underwater basement. Each metal rope 128 after it emerges from a small opened roof door of the basement (said doors are multiple in number and situated in equidistance), passes through a tubular ('the rope tubular' 133) that is erected about the roof door, the upper end of the tubular 133 rising to surpass the water surface 164. Said tubular structures 133 are erected when a steered away DIR returns to the base. Each tubular 133 articulates and locks-in with a complimentary structure around the roof door, in a car-trunk like water-tight closure. Beneath the roof doors, there are roof compartments 137, where the upper parts of a metal ropes 128 are normally saved. A container-box (not shown in FIG. 2) in the roof compartment unwinds the rope 128, when it is pulled. Following the articulation of all the tubular structures 133, the water within is suctioned out, and the roof doors opened by a common key, to bring out the terminals of the ropes 128. Each roof compartment has a switch to operate a motor 134 of the basement, to exert traction on the rope 128, the motors also controlled by a common device. After the DIR is brought down and locked, the ropes are disengaged to be saved in the roof compartments 137 and the rope tubulars disarticulated. The traction of the motor 134 is by cog-wheel motion that exerts a slow traction on the rope 128, so that the DIR may not dash onto the basement structures, or drift away from the platform 124. Each roof compartment has solar-powered lights to aid any activity after a night fall.

The 'rope tubular' 133 is sufficient in its dimensions that a man can stand within it on the permanent base 124. A ladder structured like an inverted V is used to get into the 'rope tubular' 133. There is structuring also on the base 124 to steady the ladder. The land mark roof windows are numbered, and are signaled by solar lights covered by strong metal grid over glass, and are put on as soon as the DIR is detached. It is an option that the numbered 'rope tubulars' and their complimentary structuring on the permanent base are made with one inch difference between each, so that the largest tubular can accommodate the rest, to be kept in the 'security' station 120 of the DIR in a space-saving manner, to serve during an emergency.

On the base platform 124, the complimentary 'articulating structures' with the rope tubulars 133 are secured by watertight lids that are in flush with the base. The locking articulations are thereby protected from particulate matter settling and otherwise preventing a 'watertight locking'. The multiple covering lids are also locked, each opened by a similar key, but opened individually when the window is ready to be accessed.

The metal block of air capsule—the DIR 108 needs additional measures to overcome its built-in buoyant forces for the downward traction to be effective, as the steered away DIR returns and is readied to be stationed on the base platform 124. To that effect, the geometrical center of the DIR comprises a room size metal block in its floor structure that is in fact an 'air capsule' with an outer shell of water compartment. The air capsule, dipping to the bottom of the DIR's floor, imparts great buoyant effect to the DIR, in addition to the bottom metal covered wooden platform doing so to a certain extent. The metal block of air capsule comprises a nozzle that is capped and locked normally, whereas the water around the air capsule is kept frozen all the time. The part of the DIR rooming the metal block of air capsule is structured like a 'spray-room' (to be described later) spraying cold water, the sprinklers automatically activated upon a fire-alarm. When the DIR is ready to be pulled down, the capped nozzle of the metal block of air capsule is unlocked, while water is let in, whereby the downward traction by the ropes 128 exerted as a cogwheel motion is most effective. Though the motorized traction is not opted, the 'pulley anchoring' to the DIR effectuates a requisite precise downward motion of the DIR. Of what concerns said downward motion is—to precisely position the DIR to lock with the base platform, and such positioning can be set forth by any suitable means thereof. After the hectic pace calms down, the water is completely suctioned out of the metal block, as air is let in. It is now readied to be capped and locked again, while the DIR regains its full buoyant effect. The air capsule has sufficient air volume to counter the pre-configured weight that the DIR may not exceed (that includes the numbered crew), however with a wide safety margin. If the crew had entered the basement, but it is confirmed that the DIR cannot be mobilized from the base and the fire is quickly spreading and generating heat (that can explode the air capsule), the 'security crew' and the 'steering crew' are requisitioned to open the nozzle of the metal block by remote control, to let it fill with water. Each one of them carries a remote control at all times, so that at least one would be able to circumvent the danger. It has to be done also, after the boats are mobilized and the crew is ready to get out, when the fire is uncontrollable in a mobilized but unsalvageable DIR, so as the DIR structures that may otherwise be exploded by the air capsule, will not hit any boat nearby.

The locking/unlocking of the DIR to the base platform—in right positioning, the DIR 108 is locked (or unlocked) by equipment similar to the locking of a car door (in a magnified size with an allowance for some imprecision) by a remote control. These multiple locks are located on both sides about the floor of the DIR. Locking/unlocking is done individually, each side being also controlled by an universal button. Following the rise of the DIR to the water surface upon unlocking, with another remote control the steering station 122 is activated to a smooth automatic straight course, until taken over by the crew. In conformity thereof, the engine is set forth in a fixed minimal speed so that the sudden movement of the DIR is not jolting to the tall and heavy rig structures. The DIR has retractable hooded wheels (with 360° mobility) for finer adjustment (all four wheels work in synchrony, and also independently controlled) of the DIR's positioning and locking, upon its return to the base. Other mechanical locking devices can also be used together, or else in place of the car door like locking device. When the DIR returns to the base, though not all locking devices are operative, locking opposite corners are effective for a stable DIR stationing. The base components of the locking devices should be cleaned, if locking is unsatisfactory. Other commercial locking devices can also be used at this time.

The DIR's detachment—at the junction of the detachable walkway and within the DIR 108 past the watertight door, a 'crash cart' is equipped to disconnect the tubing 107, and the wiring 105 that connect the two areas. Each tubing and wiring is differently color coded, and every crew member should know how to instantly disconnect or sever, and clamp or seal each tubing. At the junction of the corridor and the DIR, the threaded metal tubes 107 about the walkway are made of conjoining rubber tubing in a C or U configuration 109 for their easy severing. The ends of the metal tubing 107 are clamped on both sides in any conventional manner before cutting the rubber tubing. By threading the metal tubing throughout, conjoining later is deemed possible by instant 'joint structures' (to be described later). The wiring 105 is connected in this area to be instantly disconnected. After the flexible cut ends of the C or U tubing on either side are drawn into the corridor 110 and into the DIR, the watertight doors are closed, and following it, the watertight detachable walkway is detached. The signal to unlock the DIR from its base 124 is set forth by key personnel carrying the remote control. Working with remote devices should be the priority to minimize the wiring within the DIR.

Accessory fire control, salvage, and reparative measures—multiple spooled rolls of burlap stored in reserve at strategic places in a roof structure and above heavy equipment (with their lower ends secured, to be easily reachable) of a DIR/off-shore rig, to be instantly made wet and thrown on burning objects/equipment/affected crew members, are the most effective accessory measures in putting off the fire. Perforated interruptions as in a 'paper towel' enable instant severing of the needed length of a burlap roll, so that different objects/equipment/affected crew members can be swiftly wrapped-up in wet burlap, to put off the fire. Such measures are best effectuated in conjunction with instantly closing the threaded tubular systems, to shut off the unceasing gas emission from a compromised conduit line. Additionally, the heavy/costly equipment are wholly jacketed with layers of fire-proof structures and sheaths of burlaps over a water-proof underlay while manufacturing, their tubing connections devised to be threaded throughout, to emergently reconnect, when the tubing or the appended structures are destroyed.

If the mobilized DIR 108 had caught fire, the sprinklers must control fire easily as the DIR is now moving away from the source of danger. The crew can move away only as far as it is deemed safe, but working about the security devices through remote controls, being also vigilant about the expert fire-fighters left in the base, trying to prevent the well explosion, whenever anticipated. The crew returns soon after the fire is put off, and starts the reparative processes. Clearing of the rubble into the ocean is easier than a ground clearing. For emergency reparative processes to restore the temporary and permanent well integrity by plurality of measures as described in the cross referenced and other related applications (the U.S. Pat. No. 9,175,549; and the invention titled as 'Sea Level Gas Separator of Oil Well Effluent with incorporated Emergency measures upon a well blow out'), a planned rig structuring/renovation is done as needed.

Rescue measures—when it is clear that staying back only endangers the lives of the fire-fighters, everybody leaves the base. It is in the best interest that every crew member is trained in basic fire-fighting. Those skilled and stayed back, should jump into the ocean in threatening situations. They must dive-in if they had caught fire (to avoid surface oil) and swim to clearer waters, that is, towards the darkest direction. The DIR steering crew should keep vigilance with night-vision binoculars, and as they leave, at least two will go in a lift-boat to follow, and rescue the fire-fighters, by swimming if needed. The solar lights of the boat hint the fire-fighters the direction to pursue in water. These are worst case scenario, and better options are described in subsequent sections.

A Model of DIR's Basement Fire-Escape (Sumathi Paturu In-Situ Model)

The DIR basement apart from a storage place and a 'power-house' of electric generators, it also serves as a 'fire-escape' right within the rig. It is a critical and legitimate concern of how to access the underwater basement from the surface DIR, without an unwanted compromise of this vital structure. The entry is structured therefore with meticulous security measures and unfailing accessories, the latter including measures to safely reach the destination. Two models are herein described and are named as 'Sumathi Paturu In-situ Fire Escape Models', after its Inventor. The schematic of the access models, not drawn to scale, are shown in FIG. 3A and FIG. 4. Being configured as a fire-escape, the basement's fire-escape access models are structured to the purpose, so that a quick entry is accomplished upon a rig fire. The following description, in conformity thereof with the illustrating FIG. 3A and FIG. 4 enumerates the devised models that are:

(1) 'A Water Sealed In-Situ Basement Entry Devised as an Emergency Fire-Escape in a Detachable Island Rig—a Holder Model' (Sumathi Paturu's Holder Model).
(2) 'A Water Sealed In-Situ Basement Entry Devised as an Emergency Fire-Escape in a Detachable Island Rig—A Moving Carrier Model.' (Sumathi Paturu's Moving Carrier Model).

The Basement Entry Devised as a 'Holder Model'

In this model, the DIR's basement fire-access is guarded by two room-like enclosures within a specially structured 'spray-room', the latter eminently protected from fire. Said two enclosures are: 1) an 'inner' enclosure, the DIR's Staircase Room (DSR) 154, a modular 'detachable' structure above and around the 'basement roof window' (BRW) 179 of the basement 130 (the BRW 179 also conforming to be the 'floor window' of the base platform 124), said DSR 154 rising up through the DIR's floor opening 100, to be surpassing the ocean surface 164. The walls 103 of the DSR 154 are locked in-situ with complimentary structures 160 on the permanent base platform 124, in a model of the water-tight 'car-trunk closure', unlocked by remote control; 2) the 'outer' enclosure is a 'permanent' DIR enclosure (PDE) 168, erected as a strong concrete floor structure of the DIR 108, conforming to be a boundary of the DIR floor opening 100, around the DSR 154.

1) The DIR's Staircase Room (DSR)—the 'inner' modular enclosure of the basement entry, the DSR 154 is structured to be attachable, and to be secure, it is comprised of two similar walls 103 on all four sides, each with independent locking articulations with the permanent base 124. As DSR is the structure that safe-guards the basement 130, it should be immune to flooding, breaking, or caving in. Accordingly, the walls 103, preferably in rectangular configuration, are made of very sturdy steel with strong magnified locking devices 160 in equidistance about the base, effectuating car-trunk like 'water proof closing approximations. The locking and unlocking with the complimentary devices 160 are operated by mechanical as well as universal 'remote control'. The DSR not directly exposed to the exterior, and being only touched by few ocean tides, its footage is protected from undue perturbations of the ocean waters. The male components of the locking of the walls 103 are configured on the base platform so that particulate matter will not collect when the DIR is steered away. The DSR 154 is open about the top, whereas its floor is formed by the roof window door 193 of the Basement Sliding Room (BSR) 112, when it is locked. The walls 103 can additionally have cement or concrete reinforcement to give needed thickness, with metal brackets about the top and the bottom. The bottom of the walls 103 have strong washer-like rubber guards (of vulcanized rubber) throughout, to provide water sealing, just as the car-trunk model The Staircase and Sliding units—there are sets of staircase and sliding units (SSU) 158 originating about the lengthwise dimensions of the interior of the rectangular DSR 154 (there from to extend lower down into the BSR 112) for the crew to quickly evacuate from the DIR 108. Each set 158 is configured as a top staircase structure and a bottom sliding structure. Each top structure is fixed to the inside of the inner wall 103 about its upper end, further reinforced lower down by a transverse bar 159 from the inside of the inner wall 103, wherein the bar 159 also extends inwards to function as a long support handle of the top staircase structure. Each bottom sliding structure of the unit 158 is fixed below to the BSR floor 161, further reinforced higher up by a transverse bar 157 affixed to the interior of the wall 198 of the BSR 112, the bar 157 also extending outward to function as the long support handle of the bottom sliding structure. The top structure of the set 158 has its staircase facing the interior of the DSR 154, whereas the bottom structure is positioned in an opposite direction, its sliding surface facing the walls 198 of the BSR 112. The crew members, to get into the DSR 154, sit on the widely configured top of the outside stair case 173 of the DIR 108, while their feet reach the seat (with also sturdy support handles) of the top staircase structure of the DSR 154, wherefrom they descend down to the bottom step. They sit on the broad bottom step as their feet come to rest on the 'top seating' of the bottom sliding structure. Standing on the 'seating structure', they turn around to sit on it, and then to slide down to the cushioned BSR floor 161, to come to a rest onto the minimally hollowed BSR floor adjoining the side windows 199, wherein they move forwards to slide down the adjacent sliding structure 181 to reach the basement floor. The top 'seating' of the sliding structures are broad and continuous, so that few can stand additionally, while some one is sitting and getting ready to slide down. The floor 161 of the BSR is well cushioned to prevent injury, if anybody accidentally slips from the seating structures. A disposition allowing an 'intervening space creation' plan (the ISP) between the two components of the SSU set 158 facilitates needed space for the two sliding roof window doors 193. The opposing disposition of the two structures of the sets 158 avoids steepness in their structuring, if the DSR is deep, due to heightened rig platform, to prevent its water drenching. Each component of the unit 158 with its own hand rails can be configured next to each other without too much of intervening space. As the BSR 112 has sufficient height, those waiting can either sit or stand about the space between the sliding sets diverging from the center of the BSR 112, so that the roof window doors 193 can be shut, for the DIR 108 to be steered away. All the crew members sign in about the entry-data portals, and a security guard controls the DSR/BSR, while also communicating with the steering crew. After a loud buzz followed by an announcement about the DIR detachment, the BSR roof window door 193 is shut.

The Basement Sliding Room (BSR)—the rectangular tub like basement sliding room (BSR) 112, sunken from the base platform 124, is within, but substantially smaller than the DIR floor opening 100, and is wholly positioned in an elaborately reinforced structure 127 of the roof of the basement 130. The four walls 198 of the BSR 112 are in dimensions proportional to the DSR 154. The BSR roof window 179 is about a level in conformity with the basement platform 124. The roof window 179 has car roof like closures 193, moving side wards. FIG. 3A shows an opened roof window 179. The reinforced roof structure 127 accommodates two similar sliding roof closures 193, for extra security. The top closure is made of steel and the lower made of bullet proof glass. The top closure is locked first emergently, and the lower locked later, the remote controls for both the closures being set forth separately. The FIG. 3A shows the BSR roof window 179 situated below the surface water 164 just as the basement is, and so will be 'water-sealed' if locked, whether or not the DIR 108 is detached, and whether or not it is salvageable while locked onto its base platform. It is for the reason—if the surface structures including the DSR articulations 160 are destroyed, the ocean water will immediately flood the roof closure 193, thereupon water-sealing it.

The basement Sliding Structures—the BSR 112 about its floor 161 has side windows 199 in its lengthwise dimension, and they open onto a common platform of seating structure for the down-going slides 181 that the crew can instantly slide down through, to get into the basement 130.

2) The Permanent DIR enclosure (PDE)—on the DIR floor, conforming to the spatial boundary of the area 100, there is a rectangular permanent DIR enclosure (PDE) 168 that surrounds the DSR 154, and in turn covers it about the top with its watertight DIR closure (DC) 170/192. The DIR enclosure 168 being a permanent structure just as the rest of the DIR, it is made to be sturdy.

The fixed metal holders of the PDE—about one of its walls, the PDE 168 firmly affixes the two walls 103 of the DSR 154 in a lengthwise dimension on one side, by strong metal 'holders' 175, closely spanned in equidistance. Such 'fixed' metal holders 175 are shown in a 'downward incline', on the left side of the FIG. 3A, wherein the walls 103 are locked with the complimentary base structures 160, the model and the movement of the fixed holders 175 being similar to the hinge-joints of a car trunk closure. When the walls 103 are unlocked by remote control from the basement components 160, the fixed holders 175 automatically assume an 'upward incline', though minimally, when the upper ends of the walls 103 approximate the DC 170/192, and the lower ends withdrawn towards the floor of the DIR 108.

Figure 3:
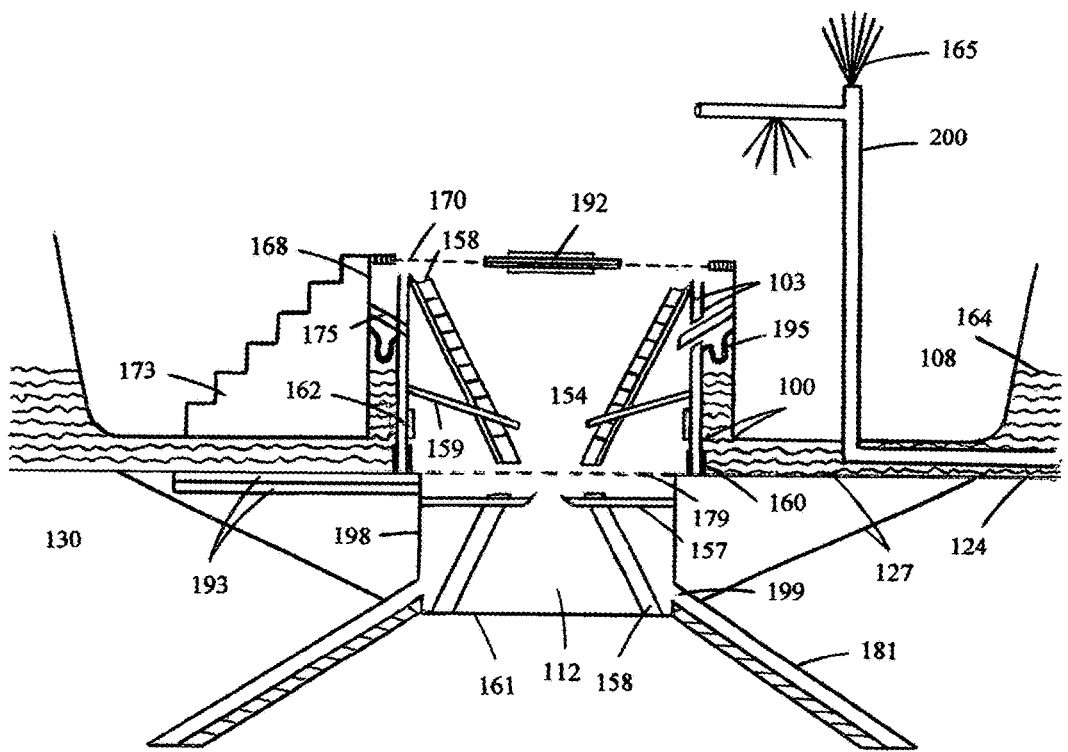
Figure 3:
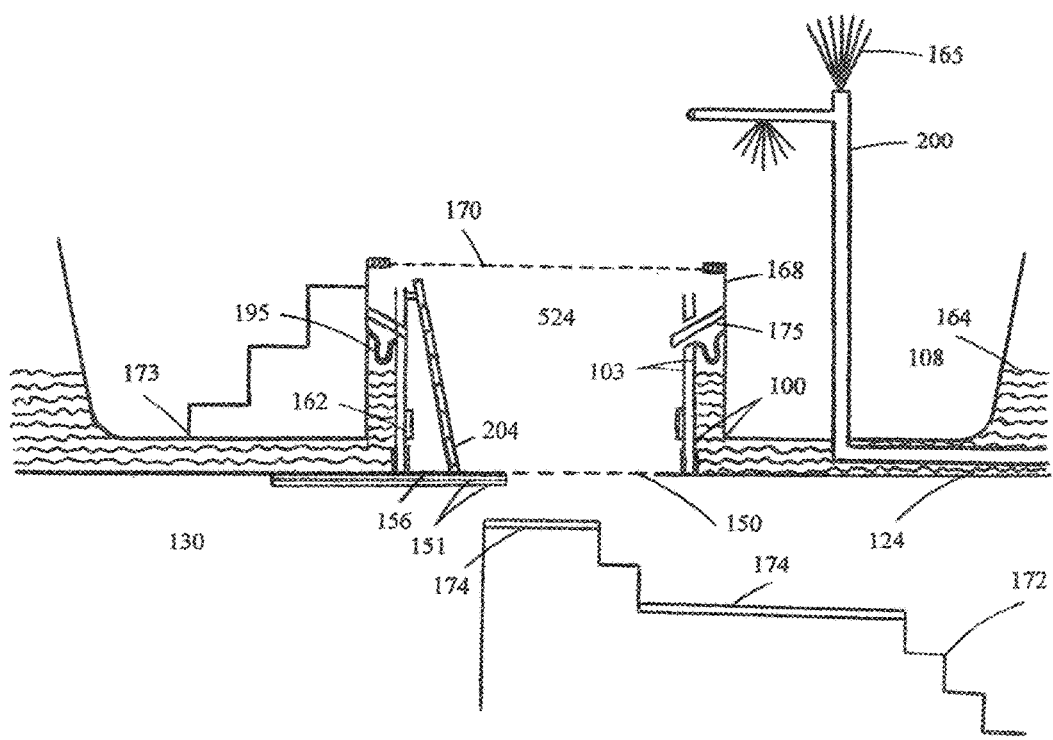

On the other side, also about the lengthwise dimension, the hinged metal holders 175 about the PDE 168 are longer, as shown on the right side of the FIG. 3 A, but are similarly positioned, that is, in a disposition that are mirror images to the holders about the left side. However, the right side holders 175 are not fixed, and they pass through slit-like openings about the two walls 103 of the DSR 154 allowing a complimentary movement of the right side walls 103, when the fixed holders 175 about the left side walls are moved to either a downward or an upward incline. The slit-openings, the hinge joints, and the lengthier dimensions of the right side holders 175 allow free movement of the DSR 154. When rested on the base in a locked articulation, the right side holders 175 yet support the top components of the side walls 103, and the staircase units of the sets 158 of the right side of the DSR 154.

The walls 103 of the DSR 154 about the widthwise dimensions have no holder supports, but are locked in water tight articulations 160 about the base platform, and additionally have the supports of the inward legs (described below).

About the opposing surfaces of the DSR 154 and the PDE 168, below the level of the metal holders 175, there is a strong conjoining rubber sheath 195 (of vulcanized rubber) of multi-layer thickness, extending all through the inter space of the DSR 154 and the PDE 168, as a water-tight barrier that isolates and guards from the rising tides and turbulence of ocean waters, when the DIR is on its permanent base 124, and the roof structures 192/170 of the PDE and the roof structures 179/193 of the BSR are open. The rubber sheath 195 is very redundant with an U shaped fold that allows the varying inclines of the holders 175.

The tripod supports of the DSR—apart from a locking base, the DSR 154 is configured with firm tripod footage, preventing it from buckling. All the four inner walls 103 have closely spanned sets of two inwardly diverging legs (not shown in the drawing) in equidistance, to give a broad tripod base. The two legs have deep-set outer threading, and each leg is threaded into two forked 'tubulars' with complimentary inner threading, wherein the common stem of the fork makes 25-30° angle with the inner wall 103 of the DSR 154. Some of the common stems are affixed to the inner walls 103 above the level of the holders 175 and some below the level, whereas the legs are resting on a small area of the base platform 124. Each leg is maximally threaded into the fork 'tubular' before the walls 103 are locked to the base. Following their locking, the free floating legs of each set are threaded down to a required length, so that the strong rubber caps of their lower ends are firmly resting upon the small area of the base platform 124. It can be understood that the stems of the forks situated above the level of the holders 175 are set forth between the holders to make such positioning possible. The legs about the widthwise dimensions lay underneath the widthwise staircases (detailed below) that are frameworks, and not solid structures.

The light weight structures of the DSR—when the steered away DIR 108 is in open waters, the sturdy walls of the PDE 168 carry the weight of DSR 154 by the metal holders 175. To make the DSR 154 light-weight, its inner walls 103 on their inner side have horizontally coursing air capsules 162 near the lower ends, so as they are made buoyant. The hand rails of the top staircase structures of the SSU 158 are made hollow, rendering them light weight also (however, they are not heated up in a rig fire, being situated deep within the 'spray-room'). That is, the inner walls of the DSR 154 and their appended structures are made of buoyant solid matter imposing no strain to the PDE 168. When the DSR is stationed about the permanent base 124, said air capsules however impart no buoyant effect, to make its footage weaker, the inner wall being not in contact with ocean waters.

The staircase provision within the BSR and the basement—few of the sliding units 181 have staircase provisions within the basement 130, structured next to them, their top platform being common. That is, one can climb up the basement staircase, and through the top common structure, can get into the BSR 112. Both the widthwise dimensions of the DSR and BSR also have staircases (with dividing hand rails) called 'widthwise staircases' (WSC) that are frameworks and not solid structures, that is, past the intervening space, the top staircase structuring continues into the BSR 112. The lower sliding structures of the SSU unit 158 within the BSR being diverging from the center, the bottom BSR part of the WSC can extend into the center between the sliding structures of the SSU, without interrupting their flow. People coming down the WSC can sit in the space between the sliding units, while waiting to get to the basement. It may be noted that the WSC is the only provision through which people can get out from the basement 130 to get into the DIR 108, as one can go down through many sliding units of the BSR 112, but may not otherwise go up to return to the DIR 108. The WSC is also the means the security guards go about rounding on a regular basis, whereas the rest of the crew is mandated to use the 'general purpose entry' (wide infra), if the basement is used as the living quarters.

Re-articulation of the DIR with the permanent base—when the DIR returns after being steered away, its positioning on the base 124 is fine-tuned. It is obvious that the DIR gets on to the base in a reverse-gear that it is capable of on water, in a slow locomotion. Fine tuning of the positioning is helped by the metal ropes 128 (FIG. 2) passed through the rope tubulars 133, and hooked to their corresponding ringed structure 129 (or to their circular non-metal ropes) about the side walls of the DIR, to pull the DIR backwards onto the base platform 124. The 'cog-wheel' motion of the basement motors aids a controlled maneuvering. On the base there is also a pair of 'rope tubulars' 133, located on either side of the fire-proof corridor 110 that will exert traction on the most distal rings 129, approximating the DIR with the walkway about the corridor 110. Following its intended positioning, the DIR is pulled down onto the base by the traction of all the pulleys 126, while the air from the air capsule of the DIR's metal bottom is evacuated, as also the water is let in. The latter being a slow process, the submersion of the DIR is accomplished very gradually without causing unwanted 'crash' on to the base platform. Geometrically configured 90° of vertical upward coursing of the metal ropes from their pulleys indicates proper positioning of the DIR in its downward descent. However, initially only one corner of the DIR 108 is locked to the base platform.

Even before the DIR is brought down from the water surface, the holders 175 are kept in optimal upward incline by lifting and holding few of the fixed holders 175 by two metal prongs, so that the lower ends of the walls 103 are in flush with the bottom structure of the DIR 108, and the articulating lower ends of the walls 103 are protected during DIR stationing. Large particulate matter is removed from the base, followed by suction cleaning under a bright light source from DIR electrical generators. The legs of the inner walls 103 should be threaded deeper into the 'tubulars', to stay free-floating at this time (for a perceptible and firm snapping DSR articulation with the base structure). Following it, an alignment is done between the PDE 168 and the base platform 124. All the corners of the PDE 168 have embedded 'pole tubulars' (with top lids) (located outside the rubber sheath 195) that are precisely in a vertical axis with the 'pole tubulars' embedded in the basement platform. The plugging of the latter are removed, and alignment poles are passed through all the four 'pole tubulars' above and below, while the positioning of the DIR 108 is adjusted to that effect, the DIR wheels partly drawn out to touch the basement. There is 1-2 feet gap between the PDE 'pole tubulars' and the 'pole tubulars' embedded in the basement platform, and the inner walls 103 are in an upward incline at this time allowing some bottom space, for the crew to inspect and follow the events of the alignment. Night vision videos about the bottom corners of the PDE provide visual prompting for the steering crew. Aligning opposing corners of the PDE is tried first. Following full alignment about all four corners, a snapping DSR articulation is done, to be perceived by the crew. The locking of the rest of the DIR's locking structures to the base is the subsequent event (it was earlier mentioned that initially only one corner of the DIR 108 is locked to the base platform), following which the alignment poles are removed, plugging of the basement 'pole tubulars' done with a long forceps, and the top lids of the PDE 'pole tubulars' closed. The water within the DSR is suctioned out to detect any leaks about the bottom DSR walls 103, by thorough inspection. The legs of all the four inner walls 103 are now threaded out to firmly rest them on their terminal rubber caps about the base platform.

Multiple basement entries can also be materialized in this model, wherein precise alignment with one basement access invariably ensures a precise alignment with the others.

The Basement Entry Devised as a 'Moving Carrier' Model

A 'MOVING CARRIER' MODEL is a modified simpler model of DIR basement fire-escape entry depicted in FIG. 4 in conformity thereof with the description herein follows. It shows DIR 108 and its floor opening 100, and the 'permanent' DIR enclosure (PDE) 168 erected as a strong concrete DIR floor structure, conforming to be a bounding structuring of the DIR floor opening 100, as in the previous model. It furthermore shows the basement's roof window 179 and its two window closures 193 within the reinforced roof structure 127 as also in the previous model. A 'moving carrier' 212 is capable of moving up from the basement floor 452, to rise through the basement roof window 179, and the DIR floor opening 100, so as its opened top surpasses the surface 164 of the ocean waters, to be nearer to the top of the PDE 168. The 'moving carrier' 212 is configured to be immovably resting on a bottom support structure 258, said support structure only open in areas of the sideward window structures 280 of the carrier' 212. The support structure 258 not only strengthens the bottom of the carrier, but also aids in the 'moving maneuvers' of the 'moving devices' located in the basement 130. The basement roof window 179 is closed from the ocean water by 'Water Barrier' structures erected around it on the basement floor in a rectangular configuration to create an enclosure. The two structures 208 in FIG. 4 represent the vertical sections of a Water Barrier (WB) enclosure erected about the lengthwise dimensions (that are the lengthwise barriers, LWB), whereas the distance between them representing the widthwise dimensions of the barrier structure, the WB enclosure 208 surpassing the surface 164 of the ocean waters. The barrier structures 208 are preferably in steel, and apart from hinge joints, their inside walls are additionally 'sealed' to the concrete/steel roof platform 124 of the basement (in the manner of a dish-washer door 'seal' to the 'washer' compartment) with a thick and sturdy water-proof sheet predominantly composed of vulcanized rubber. The LWB 208 erected to stand in an upright 90° angle are capable of inward movement towards the window 179, but otherwise restricted by outwardly placed brackets 250 arising from the basement floor. The structures 208 about the widthwise dimension (WWB, the widthwise barriers) are attached in a similar manner to the roof platform 124, but their movement in outward direction is possible, whereas moving inwards towards the window 179, they articulate with a snap with the sides of the LWB 208, the latter augmented to be sufficiently thick (for a visual impression, nearing the thickness of the metal door of a typical bank vault), for a secure articulation. The structures 208 have no weight bearing function, and are designed to be only barriers, isolating the ocean waters.

The emergency entry of the crew upon a rig fire—about one of the lengthwise dimensions of the PDE 168, a broad staircase structuring 173 provides a swift access to the crew, its projectile structure approaching the top of the 'moving carrier' 212 situated inside the erected structures 208. A continuous frame work of stair case 242 extends in the lengthwise dimension of the carrier 212, being only separated by hand rails to facilitate an orderly movement of the crew. The rails are provided with secure hand supports 248 at the top, and supports 254 about the floor of the carrier 212 wherein, adjacent to the floor of the carrier, the windows 280 about the wall open to a basement stair cases 205. Each stair case 205 has only basement floor supports with no material connection to the carrier 212, the latter being devised to be a movable structure. In a descended disposition, the carrier 212 directly opens to the basement floor 452. The floor of the carrier 212 and the adjoining basement floor are cushioned to protect the crew from accidental falls.

About the opposing surfaces of the enclosure 208 and the PDE 168, a water-tight barrier unit 203 isolates and guards the normally open structure of the PDE, and the open roof window 179 of the basement from unexpected rising tides and turbulence of the ocean waters. The PDE component of the unit 203 that runs through the entire lengthwise dimension on either side, comprises a linear block of rubber with a central indent into which a complimentary structure, also made of rubber, arising from the LWB 208 engages, creating a water-proof barrier. However, about the widthwise dimension, as shown in the vertical section of the 'inset', two wedged structures 252 in the inter-space of the WWB 208 and the PDE 168 create a nested configuration throughout the widthwise dimension, wherein a rubber guard, by virtue of its smaller linear dimension, is manually inserted for a water tight closure. This different structuring facilitates an outward movement of the WWB 208 beyond a 90° angle, so that a snapping closure is possible with the LWB 208 during an articulation. A disarticulation of the enclosure is done through a remote control by responsible personnel of the steering crew after the window doors 193 are locked during the DIR's disengagement. The crew also removes the rubber guards about the widthwise dimensions, when the WWB 208 fall back by few degrees. With remote control the two LWB 208 are timed to fall towards the window 179, to close opposing each other like the two doors of a room, following which the two WWB 208 also fall towards the window 179, to rest upon the two LWB 208. Ideally, if the measured breadth of the entry structure and the height of the structures 208 are optimal, the two LWB 208 can close opposing each other like the two doors of a room. The basement roof about the basement entry is structured lower than the rest of the roof platform in this model, so that the structures 208, when they close resting on the base, stay in flush with the rest of the floor. For re-articulation, the structures 208 are manually lifted or lifted with lift prongs. The movement of the LWB 208 being limited to 90° angle by the brackets 250, a precise articulation with WWB 208 is possible, as also it facilitates proper engagement with the indents of the rubber barrier 203. Following the restructuring of the barrier enclosure 208, water is suctioned out from within the enclosure, after the basement's roof window doors 193 are opened.

The movement of the basement carrier—many conventional operations are available for the short-distance ascent and descent of the basement carrier 212. It can be done with remote control, by a giant lift prong, by a crane like structure wherein the 'carrier' conforms to a spread out terminal of a crane, or by pulleys moved by powerful motors, the maneuvers similar as the pulley movement already described in this disclosure (FIG. 2), however with a difference that the pulley ropes are fixed to the carrier 212. The fixtures at the highest level feasible pull down the carrier, whereas the fixtures at the lowest level, to the structure 258, with the pulley maneuvers reversed, move the carrier upwards. Obviously, the operative motors and the sets of pulleys are different for either movement. The basement if elected as living quarters, controlling these provisions is easier. It can be probed into, if the popular and easy to use 'elevator' model is cost effective for a very short distance the carrier is moved, and its expected scarcity of use. However, it can be argued that the precariousness of the situation imposes a greater bearing than the cost. Using the carrier with ascent/descent maneuvers at least once in a month with maximal participation during the event, ensures the workability of the basement carrier, as also it makes the crew familiarized with the practical aspects of its operability. The maneuvers of the barrier enclosure 208 and the roof window doors 193, should be practiced by the security and steering crew, at least few of the security crew getting into the basement upon a rig fire. The security and steering crew personnel are indeed the regular workers, the brightest, the most responsible, and technologically better versed among them being additionally trained and paid, the security monitoring of the rig and the vicinity assumed by at least two people every day, on a rotation.

Obviously, the carrier 212 stays in an ascended position for an emergency use, and an otherwise daily use by the security crew, and its descent is needed of, only during the time the DIR is steered away and the basement roof window 179 needs to be locked. Multiple basement entries are better materialized in this model, with the added benefit that the anxious anticipation encompassing the precise articulation needed of in the 'Holder' model, is herein overcome. The sheeted rubber 'seal' of the water barriers 280 to the base platform is mandated to be periodically inspected. An alarm provision through multiple 'capillary suction tubes' (wherein even minute amounts of leaked water can rise up) positioned about a 'leveled' basement platform (covered by the rubber 'seal') around the window 179 and inside the barrier enclosure 280, can signal a leak, to close the basement roof window doors 193 immediately, and the rubber 'seal' replaced or repaired. As an optimistic provision thereof, no allocated weight bearing function of the basement entry enclosure 280, takes away the brunt upon this vital structure, as also its rubber 'seal' is isolated in entirety from the sheer forces of the ocean tides. Two basement entries ensure the security of at least one of them to be functioning at any time.

The Accessory Provisions for a Safe Fire Escape

The Spray-room—the fire-escape entry of any off-shore rig can be devised to be structured in a 'spray-room' 197. There are spray poles 200, each carrying multiple feeder tubes rising from the bottom of the DIR (or from a similar bottom structure of a jack-up rig), and drawing water for the sprinklers from a deeper level about the ocean, the surface water being occasionally oil laden (this being applicable to all the sprinklers within the rig). The spray-poles of metal, supported by tripod bottom, are clustered about the PDE 168, and the spray is a wide caliber stream 165 that jets water all around, only sparing 1-2 feet about the PDE 168. The sprinklers are directed down into the room, self-bathing the poles, while some are within the roof structure, drenching its layers. The roof sprinklers are activated when the fire seems to be spreading. The roof of the 'spray room' is made of layering as: a sturdy top metal sheet with surface sprinklers, layers of burlaps, layers of mattress like sponge, and a bottom grid of roof-beams, the layers in between capable of stagnating water. Other fire-retardant materials can be added. There are heating coils in the roof to dry up its layers, after the fire is controlled. Covering the basement entry, there is a lamp-shade like metal umbrella (with peripheral water channels) set forth to protect the basement entry from water. There is an inch of water stagnation on the floor, whereas the walls of the room are protected outside by similar roof and floor extended outward. Despite the initial signs of a fire seeming insignificant, the crew must get into the spray-room. In conformity thereof with other safeguards, the entry doors of the spray-room are guarded by 4-5 oversized overlapping layers of thick burlaps with heavy bottoms, the outermost layer bound by large bands of Velcro to the adjacent walls, hindering fire, and passage of gas and smoke. Those entering open the door only minimally, and closing both the Velcro clasps and the door after them. The sprinklers about the doors are set forth to be wide and forceful. Outside the doors (excluding those leading to the boat-deck interior), a high shelf-like metal screen structured in U configuration with convexity outwards, hoards high-powered fans of exceeding size, their upward incline forcefully blowing off approaching gases, as Methane, a commonly encountered gas being lighter than air. Such fans can be set forth in strategic places about the rig, including the open areas. With the foregoing devices, the fire spreading into the spray-room through the roof, the walls, or else through the door, is unlikely. The spray-room has lights fixed on the walls, their circuiting derived from the flooring. As the requisitioned means of safeguarding the rig in entirety, the provision of spray room is modified, as follows: (1) wherein the work stations are isolated, multiple spray-rooms are deemed to be set forth, for multiple basement entries (the 'moving carriage' model preferred in this instance); (2) wherein the work stations are about different levels, upper level 'spray-walks' (wide infra) and spray-room are requisitioned, the latter located above the lower level spray-room, with a conjoining sliding structure, the basement entry being common.

The Spray-walks—in conformity thereof with the safeguarded structuring of a spray-room, it is desirable for the rig to have 'spray-walks', also mirroring the spray-room. They cover the entirety of the rig, securely leading the crew to the spray-room destination, the strategically located entry doors about the spray-walks providing access/exit to different venues including the decks of the boats. The spray-room and the spray-walks can be set forth as 'modular' units, tailored to the existing rigs, wherein they are structured to be minimally space occupying, yet sub-serving the needs. The walk-way of the spray-walks with two walls has roof sprinklers jetting water in the walk-way as well as the area in between the two walls. The doors of the walls are positioned to be not opposing, and the crew must be familiar with the structuring about their work venues and the course therefrom. The brightly lit floor-arrows of the spray-walks, solar powered, point to the direction of the spray-room, such arrangement required of, so as to direct the crew even as the area is heavily smoke filled, making visibility suboptimal. Wherein a basement is elected as the living area, even a moderate sized rig is deemed to avail space for the spray-walks. The spray-room and the spray-walks are activated emergently as the fire alarm rings, and reaching the nearest spray-walk is an easy maneuver the crew must count on, as the spray-walk/spray-room is reliably protected. It is worthwhile activating them, even though the fire is seemingly trivial, as there is no water damage to the work areas, the sprays of the sprinklers intended to be fairly confined to the designated areas. Additionally, the carbon dioxide content of emanating smoke is substantially diminished, as its diffusion and solubility coefficient in its solvent, the water in this instance, being exceptional, about 20 times more than that of oxygen, thereby making smoke inhalation not as dangerous as is deemed otherwise (the same is applicable to the spray room, whereby the carbon dioxide content of the smoke entering the basement, if any, is minimized). Following significant fire damage, on most occasions, only the outer walls of the spray-walks need restructuring, the inner walls being sufficiently 'water-sealed'.

The Spray-tracks and Track-drives—wherein the spray-walks cannot be accommodated in a rig, less space occupying 'spray-tracks' in metal or concrete, tailored as 'modular' canals (water-filled upon a fire alarm), dipped below the surface level of a rig floor, can be substituted. In rigs where 'below the floor level' tracks are not elected, they are set forth above the floor, in a configuration of rail road-tracks. In conformity thereof with the fore going structuring, there are 'Track-drives' or 'Track-wheelers' in similar number as the crew members. They are built as box-like enclosures (sized for a person pedaling a tricycle), to be riding from a 'merger' track-stand of each work station. The Track-drives set forth with a simple technology of locomotion, have two closely set back wheels like a child's tricycle, for better stability within the spray-tracks, wherein an airtight side door snaps about the front seat. The water within the tracks are precluded to over-flow, and the walls of the wheeler dip into the water. A large spray-pole within the wheeler derives water from the spray-tracks beneath, as a 'suction' device about the back-seat drives water into the spray-pole. The wheeler made of fire-proof material is otherwise structured as the spray-room about the doors and the roof (the latter however, thin layered). The wheeler is jacketed by layers of burlap, and covered by a sheet of burlap, its heavy bottom edge dipping about the track-waters. The closely spaced top sprinklers about the exterior bathe themselves and the surface burlaps, whereas the interior sprinklers can be optionally put on, and their caliber controlled. The wheeler is lit by solar head lights, as the solar lit track-arrows direct to the spray-room, each wheeler entering a stand outside the spray-room. Wherein few people in a work area together can approach a spray-wheeler, it can be devised for 3-4 people with multiple doors, however, one bigger vehicle being required of in each work station to transport an injured. Such wheeler is configured to have a narrow removable stretcher affixed to the seats, a sliding side door, and a fire-extinguisher, the latter apart from those provided outside in standard locations. Bigger wheelers are only lengthier, and in effect, have additional back pedaling without a directional steering, augmenting the speed of the wheeler, as even few seconds can count, to making a difference. The wheeler's side wheels drawn to the center, and the walls converging about the bottom, make the tracks narrow for people to walk over, availing the space. Additionally, to conform to work area cleanliness, on either side, the tracks have narrow sieved floor that drains the drippings. Upon a fire alarm, the suction pumps within the wheelers are activated, to be drenching them as people approach. So as to extinguish the fire quickly, a fire-victim is required to immediately wear a floor length 'bottom heavy' burlap attire (with a full head cover) hung by two Velcro bands about the door under the outer burlap sheet. Likewise, a work station can also have multiple shower-cubicles with similar burlap attires hung inside, to be easily drenched, and any worker can thoroughly soak himself, wear the drenched burlap attire, and thereon get into a track-drive to reach the spray-room destination. Modular shower-cubicles of minimal size with only separation walls and burlap curtains (with 'occupied' sign, to save time in finding an unoccupied cubicle) are affordable and can be easily installed. As an alternative thereof, a common room with wide caliber roof sprinklers with hanging burlap attires about the walls, can equally serve the purpose. From outside, approaching a 'wheeler' first is easier to accomplish.

The Spray-Drives—any one of the devised plans as in the fore going is more appropriate to the newly constructed rigs. Older rigs can be tightly packed, being not able to avail any space even for the spray-tracks. In such instances, they can yet have modified 'spray-drives' or 'spray-wheelers' with the herein devised additional technological provisions. Said wheelers have structural differences of wide-set back wheels for better stability, and more height, so that two water compartments are structured about the top, a smaller one supplying the exterior sprinklers to drench the burlaps, and the larger one supplying the interior sprinklers. The pedaling front wheel has wider diameter, so as the pedals, even about their downward circling, are sufficiently above the floor, to accommodate a bottom basin like 'receptacle' below, to receive the down-pouring water. Said metal receptacle extends from the side walls to spread all through the bottom, except for the openings about the wheels, wherein a fire-resistant rubber sheath covered by burlaps extend from the basin to the top wheel frames, allowing sufficient sideward turns of the wheels. The air tight snapping entry door about the front seat is located above the basin receptacle. A recirculation draws the water from the bottom receptacle to return to the top tank. There is a provision to make the interior sprinklers wider and forceful, in case a person entering had caught fire, as also he wears the burlap attire hung about the door. An on-off provision of flow from the larger to the smaller tank, keeps the surface burlaps wet unto the time the wheeler reaches the destination. The wheeler's water compartments are cleaned periodically, as the water-supply tanks are cleaned. Though expensive, 3 or 4 wheeled motorized handicap-scooter (extensively used in USA) model can be a good substitute for all drivable devices described, however the rest of the essential structuring unchanged.

Ocean side exit from the spray-room—people who could not enter the DSR 154 and stayed in the steered away DIR's spray-room, still have sufficient protection as the other side of the spray-room opens to the deck where the boats are stationed, so as when a warning alarm rings in an unsalvageable DIR, they can mobilize the life-boats. The spreading fire in the steered away DIR is not met as a dramatic befalling, but rather be reasonably foreseen. As even the steering-crew has to get out of the DIR, its minimized motion can be perceived by others.

The basement is a better refuge if fire is initiated in the DER as it is being detached, however the DIR detachment being always a better option—it is better to get into the basement if a fire was initiated in a DIR, its course being unpredictable. Even when there is no perceptible means of salvaging DIR, it is a wise choice to steer away the unit by designated members, so as some distance away, they can stop the engine and get out in boats, so as the wreckage tumbles into water. Such measure saves damage to the permanent basement, wherein the rest of the crew had already entered. It is a better safety measure despite the fact that the basement is built to be break resistant and made fire-proof by a 'water-seal'. The intervening space between DIR and the permanent base is well devised and is more about the basement entry, to create an unfailing 'water-seal' that still protects, even if the DIR could not be mobilized. The whole area of the basement, if made of concrete, is covered by a metal grid for further protection, and it may be recalled that the 'top door' of the BSR roof window 179 is made of steel, and the 'bottom door' is made of bullet-proof glass.

Aeration of the rig's fire-escape unit—a means appropriate to herein devised models providing fresh air indefinitely is described subsequently, being a vital encompassing topic.

Additional Options and Security Measures

The basement as the living quarters—wherein opted, the basement can be used as living quarters, and as a cooking and dining area. It is feasible, as a 'general purpose entry' (detailing follows) to the basement devised to be sturdy, can be used by the crew on a regular basis, whereas the BSR, DSR, and the DE are always kept open for a rounding security night-guard and a day-guard. Additionally, the basement is provided with 2 emergency exit doors, wherein their outer structures are configured to articulate with a watertight 'staircase tubular' of an emergency marine unit, equipped by the oil company to aid evacuating the fire-victims needing immediate treatment. More importantly, a gas-alarm simultaneously rings in the basement, so that its ignition sources are immediately put off and in the 'fire triangle' of 'fuel-oxygen-ignition source', the ignition source is so eliminated. Methane, the most encountered gas being lighter than air, the danger to a lower level basement is also eliminated from the 'fire-triangle'. The rig is a smoke-free area, as smoking can create a spark coinciding with a gas entrainment, which is a rare event. When smoking happens on a daily basis such coincidence is easier. Hydrogen sulfide is heavier than air but due to its rotten egg's smell, it can be detected easily at the upper level, and the basement locked immediately. Despite the basement made as living quarters, the fire-fighters and the security crew are yet required to sleep in the upper level. The sleeping, dining, and most of the day's activities happening in the basement, it is only 8-10 working hours that the crew is away from such safe-refuge. With the herein devised basement's 'aeration measures' the most basic need is taken care of, as food and other supplies in abundance are in place, as affirmed provisions. In essence, people living in a fire-escape unit are in no danger of fire. The basement can be devised to have bullet-proof glass windows with enhanced lighting, the vast oceanic aquarium being recreational, helping an otherwise sensory-deprivation. Wherein there is a repeated shark-attack threatening the vicinity's security monitoring, it can be shot by an expert-shooter through a projectile man-cage from the basement by attracting it by a bloody-bait. Everybody can be trained to shooting it from the surface.

The crew members are required to have training in underwater diving, basic life support, intravenous (IV) line management for hydrating a burnt victims (IV hydration being paramount in the treatment of burns), basic management of burns, smoke inhalation, drowning, poisonous gas inhalation, shock, and oxygen therapy management. The basement must contain large canisters of soda lime, a mixture of sodium hydroxide and slaked lime (calcium oxide or calcium hydroxide), to absorb carbon dioxide, when the basement is locked-up following a fire. Each crew member should have diving equipment in the basement, to get out of the basement through emergency exits. A SCUBA apparatus is the simplest under-water breathing equipment suitable for the occasion. The basement's side exits are opened upon an emergency, so as to exit in a 'diving mode', as once a door is opened, water gets in instantly, and at least few have to wait before getting out. However, such situation is rarely encountered, as when other exit means are not operable, and the basement's emergency exit doors are dysfunctional to articulate with the 'staircase tubular' of an emergency marine unit deployed by the oil company.

The Basement Entry for Storage Purposes

The FIG. 3B shows a minimally modified basement entry of the DIR 108 for storage purposes. In this model, the room comparable to the DSR 154, and called as staircase room (SCR) 524, is designed to have a large footage area 156 of the base platform about a side of the basement roof window (BRW) 150, so as to rest a wide ladder 204 or a staircase (either one with locked in air-columns), and additionally for 2-3 people to stand upon. Underneath the BRW, the 'standing structures' 174 in the basement 130, are structured for leading to a stair case 172. The walls of the SCR being configured with hinge joints of their holders 175, as they were for the fire-escape entry, they are similarly detached after the BRW sliding doors 151 are closed. There is no reinforced basement roof structure, there being no basement sliding room. The staircase 173 about the PDE 168 is wide, in conformity thereof to carry hefty structures. The DE 170 is one piece structure, also in conformity, and operably similar as the car trunk's hood-like watertight closure, to create a widely configured entry. The different structuring is particularly useful to carry fire-victims into the basement, awaiting EMS pick-up, apart from carrying storage goods. The DSR 154 entry is also suitable to transport fire victims, except that it blocks the swift entry of the rest of the crew members. The storage entry can be situated next to the fire-escape entry about the spray-room, the most appropriate location for its intended purposes. Structures otherwise similar to those in FIG. 3A of the fire-escape entry, are similarly numbered in the FIG. 3B, and are not repeated herein. The 'moving carriage' model is also an appropriate model of basement entry for storage purposes and to transport fire victims.

A General Purpose Entry (GPE) to the Basement

Wherein the underwater basement is elected as living area, it also has a sturdy general purpose entry. FIG. 5 illustrates its schematic model. The following description in conformity thereof with the illustrating FIG. 5, enumerates such devised model. The sturdy general purpose entry on the basement platform 124 is entered through a 'Housing-Structure' (HS) 428 located about a basement corner 429, and rising far above the water surface 164, the 'Housing-Structure' accessed through a Top Entry Room (TER) 430. An entry/exit side-door (ESD) 431 of the TER 430 is reached from the inside, through a lengthy staircase (LSC) 432 arising from the floor 434 (conforming to the level of the basement platform 124) of an Exterior staircase room (ESR) 472, whereas it is accessed through a smaller staircase (SSC) 435 from the outside. Said smaller staircase (SSC) 435 adjoins a bridging structure (BS) 436 (connected to the DIR platform), its HS terminal situated on a small walkway (SWW) 457, 15-20 feet long. A floor window (FW) 437 with a watertight sliding window door (SWD) 438 about the floor 434 of the ESR 472 opens to the basement interior 130. The SWD 438 is 'water-sealed' upon a rig fire, wherein the top structure is burnt. The FW 437 opens to a basement staircase (BSC) 439, the latter landing about the basement floor 452. The SWD 438 is opened by a remote key (carried by each crew member), and is designed to close in few seconds like an automated elevator door. The key additionally opens the ESD 431 of the TER 430. Outside the bounds of the FW 437, the ESR floor 434 is structured for a locking provision 454 for an 'entry tubular', the walls of the latter articulated in-situ (for an easy assembly) providing water tight approximation that rises above the water surface 164, to enter/exit (although as a temporary measure), when the surface structure of the ESR 472 is destroyed upon a rig fire. However, the ESR 472 and the sturdy permanent Top Entry Room (TER) 430 need to be constructed soon.

The Bridging Structure (BS) to the GPE

The small walkway (SWW) 457 that the BS 436 is situated on, is built upon a sturdy concrete structure 458, the latter rising above the water surface 164, and is in a higher plane than the DIR's work platform. FIG. 1 shows a bird's eye view orientation of the HS 428 with adjoining BS 436, about the steering side corner of the basement platform 124. The BS 436 is configured in a 'truck crane' (TC) model, the 'crane structuring' 436 conforming to the bridging, being mounted on a drivable truck 470 about the rig side terminal. The crane/bridge structure 436 is minimally inclined, to be resting on the SWW 457, however not materially connected, such disconnection required of, about the time of the DIR's detachment. The drivable truck 470 is stationed on the DIR floor, whereas its loading platform (that is, the bridge platform) is in level with the DIR's work platform. The bridging structure 436 is completely covered, so as the crew can use it as a walk way in any weather (wherein an overlapping approximation 450 will also protect from rain or snow). Yet, it can be instantly steered away, owing to its corner 'steering side' positioning, thereby staying unobstructed in its course. The craning BS 436 being rested on the SWW 457, it is most suitable in its designated function, with no strain imposed on its 'hoisting ropes' despite the tremendous trafficking. The BS 436 is protected by layers of burlaps and self-bathing sprinklers, whereas there are outwardly directed upturned fans about the site of the approximating and overlapping structure 450 and the SWW 457. The bridging with enclosure 436 has passage doors, and about the times it is driven into the rig following the DIR detachment, the crew can still walk through it, while its craning incline can be made horizontal, or else, optionally it can be left to stay in its bridging disposition.

The model of DIR encompassing a multitude of the foregoing structural and functional amenities is called as Sumathi Paturu's DIR model, so named after its Inventor.

The Off-Site Fire-Escape Modular (Sumathi Paturu Off-Site Model) Vital for all Types of Rigs Including a DIR with an Intact Basement There exist many rigs without a safe and reliable fire-escape plan, or the DIR's basement might be damaged. Additionally, the steering crew, the fire-fighters of the permanent base, and those that had failed to reach the spray-room refuge and left back in an unsalvageable but steered away DIR, need a destination. There should be a safeguarded outside refuge for such situations, as an off-site 'fire-escape' modular'. As the spray-room and the spray-walks are reliably protected and activated soon after the smoke/fire alarm goes on, reaching a nearest spray-walk is the easiest maneuver the crew can count on. Even amidst a deadly fire, reaching the spray-room is easier than resorting to ocean waters. Yet, an off-site 'fire-escape modular' is advocated for some above stated reasons, as also for some other more important, that soon will be known.

Pertaining to the events involving BP oil company's 'Deep Water Horizon' oil well blow-out resulting in collapse of the surface structure, though the live events about the scene are hard to extract or imagine, it was a fact that the oil reached the gulf-shores rather quickly. Hence, the off-site modular though easily accessible to the crew, should be sufficiently distanced, not to be engulfed by the fire, as the oil may collect more at the interrupting rig-side edge of the modular. However, it is only a far-fetched occurrence, as the fire-fighters will not, and should not let the fire spread on the ocean surface towards the modular, though oil may collect about its edge.

The FIG. 6, a schematic not drawn to scale, illustrates an 'off-site' fire-escape 'modular' housing, small or moderately-sized. The following description, in conformity thereof with the FIG. 6, enumerates such model. The weather resistant 'modular' housing is structured on a base 59 with a flat board (barge like) configuration. Said flat barge like base having sloping borders with small poles and hand rails, supports people climbing up, the flat base 59 furthermore facilitating transfer of a victim from water, by a single rescuer. The barge-base is covered by metal sheets all through its exterior, a safe-guard against approaching fire upon an oil-laden ocean surface, a rarity despite countering measures. About the outer walls of the modular housing, there are built-in watertight compartments 56 storing rescue-supplies, and foldable stretchers.

The modular has a bottom room structure (BRS) 50 and a towered top structure (TTS), the exterior of the BRS 50 built with fire retardant metal sheets. The TTS has a towered roof room (TRR) 51. The BRS 50 has a staircase structure 58 on one side, to access broad sliding-doors (SD) 53, set forth about the TRR 51. The SD 53 are 5-6 feet high, and slide sideward into the walls of the TRR 51 by a remote control, whereas hand controls lock from inside. It serves as a general purpose entry, and there is also a small terrace 62 around the TRR. The BRS 50 has an entry with a high-set threshold and watertight BRS entry doors (BRED) 54, protecting its interior from giant ocean waves. The BRS 50 is usually kept locked, except to emergently let in injured victims, and is fully equipped with medical rescue amenities. There are mini ramps on either side of the BRED. Jets of water 64 emanate forcefully from the edges of the modular flat base, thereby preventing approaching fire upon oil-laden ocean waters.

The exterior and interior of the modular—the BRS is designed with metal block flooring, said metal blocks locking air capsules to give an added buoyant effect to the unit. The modular has the origins of the aeration tubes 16 within two floor-tubs 60 in its BRS interior that travel vertically down into the ocean, to then travel in an incline to the destination of a fire-escape unit about a rig, to also terminate into two tub(s) 24 (to be detailed), the aeration tubes 16 being the reliable source of fresh air supply to the fire-escape unit, upon a rig fire. The BRS 50 comprises of helium sacs secured to its roof structure, ensuring stability of a swaying unit upon ocean turbulences. The TRR 51 houses a spacious hall, and on a side corresponding to the staircase 58 outside, the hall comprises of a stair case entry, leading down into the BRS 50. The staircase is sufficiently broad to carry injured victims in stretchers. Both BRS and TRR have windows 57 fitted with bullet-proof glass doors and installed night-vision video (monitoring) devices. The TRR 51 is structured with a high-tower 52, housing a guide-light 65, the latter as described below.

The guide light—the TRR's high-tower 52 structured to have a small roof-window closure of glass houses a rotating (about 180°) high beam flood-light 65 of a largest size, facing skyward. It is put on by the residing crew soon after the fire alarm rings, whereby the strayed crew members in ocean waters are directed to the modular. Spanning a day time, the lights are pastel-colored, as lavender, lemon yellow, or pink that contrast against the blue sky. Additional high sounding bells are an option. The tower's roof window glass-closure is devised break-proof, and is warmed by heating coils about cold weathers.

The anchoring of the modular—the modular lit by solar powered lights at night fall, is anchored to the basement of the DIR, or to the submerged legs of a jack-up rig below the surface water, by units of metal strings 6, each unit having two strings. Each string is made of sturdy but narrow metal rods or poles 67, about 2-3 cm diameter. In each unit, the adjacent metal rods 67 of a string are connected by a linkage ring 68, wherein said rings of one string are connected to the centers of the rods 67 of a parallel string (FIG. 6 illustrates them in a magnified schematic). The arrangement prevents the strings from sideward bending or sinking, so as to maintain their desired axial length, thereby the modular precluded from floating closer to the rig. To serve a similar purpose, the strings 6 are anchored to the modular or to the rig by direct hardware bolting of the rods 67, with no connecting linkage rings. The devised arrangement helps to distance the fire spreading on water, and the wind-blown gases to be dissipated, before they can breeze to the area of the modular. The units of coupled strings 6 are multiple, and they are clustered at the rig side, while fanning about the modular side, or they can fan in a vertical dimension about the rig side, and fan out horizontally approaching the modular, such arrangement leaving free space for other provisions about the immediate rig periphery. The length of a rod is configured long that only few of them are incorporated. Submerged wiring of low voltage solar lights accompany the strings 6.

Provisions for the stability of the modular and its interior—the modular is better stabilized due to helium sacs 61 secured all through the top of the BRS 50 and the TRR 51. Wherein the ocean is exceptionally turbulent, the modular may sway, but comes back to its upright positioning due to the helium sacs 61 resisting such instability. All the structures within the modular are not furnished but 'built-in', such as securely bound sleeping beds, and utilities of the kitchen. Additionally, the dining utensils and other utilities are of metal, rubber, or of unbreakable plastic. The barged base structuring also provides needed stability. It has to be realized that helium may not be inhaled in large amount, because just as nitrogen, it can proportionally reduce oxygen content of the blood with untoward consequences.

Heating of surface waters—submerged heating coils accompany the metal rods 67, to be put on in harsh cold weathers. The modular best serves its purpose, as the crew can swim to a known destination not far away, its direction led by the anchoring units, and its path lit up. The lighter inflammable gases may not access surface waters, even adjacent to the rig, as they usually ascend or spread sidewise, but not descend in an open expanse of the atmospheric air, and swimming to the modular is safer than it is anticipated.

Safety and utility provisions—the crew signs in through 'entry-data portals'. A key person keeps vigilance to the events of the ocean waters, and about the rig far away, through night-vision binoculars. At least two crew members holding clerical jobs must stay in the modular on a regular basis. Clean water is pumped in from the greater depths of the ocean. The modular serves as a destination for life boats/lift-boats that can be temporarily chained to the safe side of the modular. Rigs having no in situ or in site fire escape provision, the off site modular serves as the sole refuge. Two days worth of food supplies for the whole crew is stored in the modular to use and refill prior to their expiration dates. The rooms have bullet-proof glass windows 57 on four sides, with installed security cameras. The security crew vigilant about the territorial waters, also surveys the modular on a regular basis. A drone monitoring the rig can additionally monitor the modular.

An alternate means of anchoring of the modular at a safe distance from the rig—should it be perceived that anchoring a modular to the legs or to the submerged base structure of a DIR is an undue strain, as a better alternative thereof, it can be structured on an independently erected leg from the ocean bed, at a desired distance from the rig. The leg must have a broad base for needed stability, or else, a structuring upon two legs can be an option. Few attachments to the rig are still in place, to heat up the electric coils. The unit's barge-like base is yet positioned about the ocean surface with out an 'air gap', whereby a single person can board with a fire victim. However, the BRS entry door (BRED) way for the fire victims is set forth with two watertight doors, one comprising a threshold height of 1 foot, and the other of 2 feet height, with ramps on either side, the lower level threshold kept closed about the times the water level rises. Such structuring serves the dual purpose that the modular is protected from ocean waters, yet providing an easy access.

The Fire-Escape Model for a Conventional Jack Up Rig (Sumathi Paturu In-Site Model)

FIGS. 7 and 8, not drawn to scale, illustrate a jack-up rig based 'fire-escape' unit. The following description, in conformity thereof with the FIGS. 7 and 8, enumerates such devised model. Structure 197 represents a spray-room in a jack up rig 1, supported by its legs 2. A 'water seal' about the fire-escape entry of a jack-up rig is herein created by an incomplete shell of water-enclosure 47, said enclosure having four-walled outer structure 37 and four-walled inner structure 33, each having a bottom but open about the top, and water circulating between the inner and the outer enclosures. As the inner walls 33 of the water enclosure rise above the outer walls 37, water overflows as a 'water fall' 39 about the outer walls 37 into a small water tub 40 that surrounds the outer walls 37 about the spray-room floor 41. The interior of the water-enclosure 47 comprises a 'top sliding room' (TSR) 32, and a bottom 'water-seal room' (WSR) 34. The TSR 32 is set forth in the spray-room 197, whereas the bottom WSR 34 sunken below the spray-room and the rig level, stands on a sturdy traversing structure 43 that courses between one leg to another, and materially structured similar as the legs. The two rooms within the water-enclosure 47 are separated by the TSR's fire-retardant floor 48. The floor 48 of the TSR 32 comprises one or more floor windows (as per its dimensions) 46 through which sliding unit(s) 17 course from the top of the TSR 32, spanning about its lengthwise dimension, to reach the floor 44 of the WSR 34. Each sliding unit 17 is made of a top structure and a bottom structure with a small gap between the two, to create an intervening space of 4-5 inches for a fire-retardant window closure 5 that slides sideward like a car-roof closure. The gap between the sliding structures 17 is covered by a rubber sheet 3 that lifts up when the window closure 5 moves towards the center to close the floor window 46, whereas the rubber sheet 3 moves down to close the gap of the sliding unit 17, when the window 46 is open. The sliding unit(s) 17 is/are devised to swiftly transport the crew from the spray room 197 to the under water 'fire-rescue' modular 42. The spray-room has stair case(s) 45 about the fire-escape entry to reach the sliding unit(s) 17. The staircase structures 45 positioned in equidistance are not solid structures, but are frame-works that overlie the water fall 39. The water in the tub 40 is continuously let out, preventing flooding about the floor 41 of the spray-room 197.

The spray-room has spray-poles 25, their structure and function similar as those within the DIR. The floor 44 of the WSR 34 sunken below the rig level, not only has the affixed lower terminals of the sliding unit 17, but also accommodates an originating 'slide tubular' 28, the tubular 28 also steadied by supports from the leg 2 underwater. The 'slide tubular' 28 courses curvilinear to the fire-rescue modular 42, the latter submerged below the water surface 164. In large rigs wherein spray-rooms 197 can be only scattered due to lack of needed stretch of space in any particular area, there can be more spray-rooms 197, and one or more rescue modular units 42, anchored to different legs of the rig when multiple, distributing the imposed load, said anchoring made sturdy with materially similar structuring as the leg. The wide slide tubular 28 also has a small staircase provision to return to the rig from an entry room 10 of the modular unit 42, said room having a watertight door 12. The entry room 10 and the modular unit 42 have break-proof glass windows to monitor the events outside, and to be guided when to lock or open the door 12. The modular unit 42 of FIG. 8 depicts a floor tub 24 to receive the terminals of the air-tubing 16 originating in the floor tub 60 of the off-site fire-escape modular (FIG. 6), to be supplying fresh air upon a rig fire. The modular 42 has an air capsule 14 in its top to attain buoyancy and not to impart undue strain on the legs, to which it is secured by strong supports (of any preferred configuration). Said supports originate from sturdy transverse structures 20 of the leg, either of them materially similar as the leg. There is an emergency exit door about the modular unit 42, to open upon an unexpected compromise, while the SCUBA oxygen cylinders are provided to equip each crew member. The crew can also get out through a rescue marine unit that is deployed to emergently hospitalize the fire victims, the emergency exit comprising of provisions as in the DIR 108.

Entry of the crew and water-sealing of the fire-escape—upon a rig fire the crew should enter the spray room, wherein a fire-proof safe contains 'remote controls' for the sliding window door 5, to be picked up by each. When a person is ready to slide down, he opens the window door 5 by the remote control, to slide down immediately through the sliding unit 17 into the WSR 34, as the window door 5 automatically closes after, in few seconds. The sliding unit 17 and the slide tubular 28 have staircase provisions on one side to transport fire victims to safety, the medical rescue supplies stored about multiple locations (mostly in the WSR 34) along the transit. The stretchers have train wagon wheels to be rolled on the slide's side rails, the latter resembling rail-road tracks, punctuated by speed-breakers. A stretcher is structured with a wedge-lift about the leading end, to counter the steep of the slide it is rolled on, by two people in a controlled manner. About the intervening space of the sliding unit, a stretcher has to be carefully maneuvered, the rubber sheet 3 held in place manually. As an alternative thereof, two pieces of duplicated tracks (about the bottom sliding unit) bracketed lower down, are pulled up and held in place to fill the gap, and they automatically roll down upon release, as the stretcher is passed.

The water-seal of the fire-escape entry—in case the gas-fueled fire is uncontrollable, and had spread to the spray-room, the top structure of the inner wall 33 that is risen above the outer wall 37 is the structure that is consumed first, whereby it will not contain the circulating water within the water-enclosure 47, and the water immediately flows into the TSR 32, water-sealing the sliding window door(s) 5 and the WSR 34. For an unfailing water-seal, the top risen part of the inner wall 33, on the far side of the sliding structures 17, is made of a material that easily crumbles upon heat, to let the water flow-in instantly, thereby protecting the sliding window door(s) 5, if the interior of the water-enclosure 47 is engulfed all at once by the spreading gas-fire. Additionally, upon ringing of a TSR gas alarm set forth near the crumbling structure, all the sliding window door(s) 5 are designed to be shut, even before water fills the TSR 32. The multiple water feeders 8 originating about the leg level underwater, ascend through the roof of the slide-tubular 28 to reach the water-enclosure 47. The tubular 28 about the air-gap, and the sunken water-enclosure 47 are protected by layers of burlaps, and wide caliber surface sprinklers originating from the feeders 8.

The modular safe-guard—it is imperative that the modular unit 42 is sufficiently protected. The obvious danger is the heavy-weight structures of the rig losing their footage and tumbling down, at least their tail ends falling onto the modular 42, as an early or a late event upon a rig fire. A modular surface-guard 31 (FIG. 8), positioned in an incline and secured to two legs, is a protective structure, covering the modular all through its stretch about the legs, to be obstructing and diverting a falling structure. The surface-guard 31 also has anchoring chains 9 affixed to the legs under water, said chains comprising redundant length. The legs have closely spaced sprinklers about the air gap, as these are the back-bones of the rig, and should not crumble even upon a deadly fire. Spanning all through its length, the surface-guard 31 has a top air column 7 that is devised to be maximally sized about the leg side, and moderately sized on the opposite side, said air column 7 creating the desired incline of the surface-guard. Additionally, the surface-guard 31 has studded bottom magnets 23, wherein their lower magnetic poles facing the modular unit 42 are similar as the top poles of the magnets 15 correspondingly studded about the top of the modular 42. The surface-guard 31 is devised to let a falling structure tumble into the ocean, sliding down on its incline, and diverted away from the modular 42. However, if the world wide experience had taught that the bottom/floor of the rig had not collapsed even in the event of a catastrophic fire, the modular unit 42 can be structured between the legs, right under the rig.

Wherein the surface-guard 31 had not resisted the weight, and had broken from the leg, it still protects the modular 42 by several means: (1) it resists sinking, or to be swept away, by its buoyancy and its additional anchoring chains 9, the latter remaining intact being redundantly tied and not taking the impact of the heavy weight about the time it had fallen; (2) it maintains its devised incline due to the wider disposition of the air capsule 7 about the leg side, making the weight drift into the water; (3) it will be repelled by the similar magnetic poles of the modular 42, so as the weight as a whole will not impact the modular 42 with an exceeding force; (4) its underwater disposition makes all the contacting objects lighter than they actual are.

Multiple Exiting Slide Tubulars

The jack-up rigs can be set forth with an additional provision of safe-guarding the crew against fire, said provision being—multiple exiting slide-tubulars in work stations (especially remote upper levels). The interior rig design of the exiting slide-tubulars resembles a cubicle of standing shower with high caliber sprinklers (collected water drained out after half an inch of stagnation) devised to be a 'water seal' to an exiting slide-tubular. About a corner farther from the possible direction of the fire and free of sprinklers, a raised (about 2 inches) floor-entry to a lit-up exiting slide-tubular is structured, its sliding structure leading to a flat-terminal about the superficial ocean waters not far away, its water-tight door normally bolted. Exiting people swim to surface waters from a swimming-pool depth of the flat-terminal, to then reach the off-site fire-rescue modular, its ocean course warmed-up by heating coils at a deeper level. Soon after the bolted door is opened to exit, the terminal part of the tubular is water-filled, and it is so cautioned upon the door; hence, swift movement is urged. The exit-tubular comprises of hand rails throughout and occasional foot pedals about the sides, its course punctuated by speed-breakers at strategic places. The flat-terminal is heavily padded with cushioning, there being also a mandated speed-breaker short of the terminal. The exit-tubulars can be added as modular structures to existing jack up rigs, to be positioned away from tall heavy structures, or else exiting should be an early event upon a rig fire. The model however is not suited for temperate regions where surface water may freeze in icy zones. The earlier described in-site fire-escape modular can be receptive to slide-tubulars originating also from remote spray rooms, and additionally, to the herein devised exiting tubulars, whereby the crew need not venture into the frozen ocean surface. The model also can be used for areas remote from the spray room in a DIR, especially the fire-rescue station of the stationary rig, wherein a curvilinear slide tubular curves by the edge of the rig into the ocean, and the fire-fighters can get out through a bigger flat-terminal hoarding a life-boat. The course of the exit-tubular about the 'air-gap' is guarded by multiple burlap layers and self-bathing sprinklers. A suction device positioned above the water level of the slide-tubular drains the water back into the ocean, whereas the heating coils immediately heat up the tubular after the event is over, so that there will not be mold or mildew build-up about its interior. The tubular has connections with the leg(s) by units of metal rods, like those that connect the off-site modular, the flat-terminal additionally having strategically placed air-capsule(s) to make the overall structuring light weight.

Emergency Breathing Provisions for all Fire-Escape Models

An off-site fire-escape modular being herein advocated, to be improvised with all types of rigs, emergency fresh air provision in an unlimited manner to the fire-escape units, is accomplished as a reality through the incorporated air tubing. It is done as follows.

The tubs and the air-tubing—originating from a tub bottom of an off-site fire-escape modular, 3-4 color coded wide caliber metal air-tubes 16 travel vertically down about few feet into the ocean, where they angulate to travel in a downward incline towards a DIR basement, or to an in-site fire-escape modular of a jack up rig, to also connect under water, with the vertical metal tubing of a tub bottom. They carry fresh air, and are reliably safe-guarded in the off site modular, the latter never involved in a rig-fire. The travelling air-tubes 16, excepting their vertical terminals at both ends, are made of uninterrupted sturdy rubber tubing, covered by lengthy segments of metal tubing with threading throughout, said tubing connected by intervening closely wound spring like metal coils; as an alternative thereof, the tubing is wholly made of closely configured stout metal rings connected by thin conjoining metal segments, as a whole conforming to an uninterrupted flexible metal tubing without an interior rubber tubing—either structuring giving resilience to the travelling air-tubing, as also to be protected from the attacks of the marine life forms. In the case of the former model, the ends of each segment of metal tubing have air-tight sealing with the underlying rubber tubing, so that upon a structural compromise, only the threaded metal tubing is replaced by joint structures' (discussed in the last section of this disclosure), whereas the linear breach of the diametrically resected rubber tubing within, may remain. The latter model is amenable only for a replacement in entirety. The flexible neck of a table lamp, and a commercially available flexible garden hose called 'Bionic steel hose' ('Bionic' tubing is structured to be extremely resilient; can be found by 'Google' search) are closely comparable structures to the latter model of rubber-free air-tubing. Despite the inherently resilient structuring, either of the air-tubing is configured with sufficient redundant length, so that during the oceanic turbulence, the tubing may sway with the giant waves without breaking, or else transmitting the chaotic motion to either terminal.

Locating and mending the tubular compromise—as the air-tubes 16 are originating and terminating into the tubs (24, 60 of FIGS. 6 and 8), consequent to the structural compromise of the air-tubing, the tubs fill with water, and alarms ring on both ends, alerting the crew. Water is designed to be diverted from the floor tubs (24, 60) before they get full, to prevent flooding, however, the alarm keeps ringing until noticed, and put off. To locate the tubular compromise, the terminals of both sides that are normally kept open, are capped (said caps being 'injector caps', secured to the terminals of the air-tubes), the water is completely suctioned out from the tubs (24, 60), and while the lids of the off-site terminals are kept closed, in the rig terminals, each cap is opened to detect which air-tube is leaking. There is water in all air-tubes, but only the leaking air-tube keeps filling the tub with water. The color coded compromised air-tube(s) are further tested with 'air-injection' through closed lid(s) about the rig side of the terminal(s), while the lids of the off-site terminals are still kept closed. The divers inspect the entire length of the involved color coded air-tube(s) for emerging air bubbles about the compromised area. The injected air being in substantial amount, the rising air bubbles are made to be easily detected, even if the breach is minimal. Such testing is performed in bright day light, also with an artificial light-source, when ocean waters are calm. The involved area of the segmented metal tubing is severed, and replaced by a 'joint structure'. The threaded vertical terminals being metal, optionally the whole tubing can also be replaced. The water from all the air-tubes 16 need to be suctioned out for their proper functioning. Wherein a 'mixed' tubing device is configured, with the former model alternating with the latter (the former however comprising only the threaded metal segments with no underlying rubber tubing), a reparative structuring encompassing the threaded metal segments may still be possible, with the threaded metal segments severed and replaced, or else the closest metal segments bridged, for a damage involving any site. The off-site modular being guarded by its inmates, there is deserving vigilance to these vital structures.

Multiple sets of air tubing—despite the provision of multiple tubing, two sets of tubing 16 are elected, to terminate into two tubs located about the opposite sides within the rig's fire-escape unit, and also there are two tubs within the off-site modular, however a wide separation not required of. Both sets travel together to minimize safety measures to be implemented. It is requisitioned to construct one tub at a higher level at both terminals, wherein the top tubs are connected to one another, and so are the bottom tubs. It is for the reason, if smoke fills the fire-escape unit, the heavier gases like carbon dioxide along with particulate matter, are let out from the bottom tub, to also escape through the bottom tub of the off-site terminal. Oxygen which is lighter, can get into the fire-escape unit through the tub located higher, whereas it also enters through the tub located at a higher level of the off-site terminal. For similar reasons, the bottom tub within the fire-escape unit is better constructed near its entry (a site wherefrom the smoke enters). In the event of a rig-fire, provisions should also be in place, wherein the air is suctioned-out of the bottom tub of the fire-escape unit, whereas it is suctioned-in from the tub placed higher.

The incoming fresh air from the higher level will also force the smoke to stay about the bottom layers, and thereby forced into the tub of a lower level. However, when the fire-escape entry is open and smoke is getting in as people are entering, suctioning-out from the lower level tub is kept minimal, as it is counter-productive to draw in the smoke in a quantity more than it would have otherwise happened. On the contrary, the air that is suctioned-in from the higher level tub is kept maximal, to force the smoke out through the bottom level tub. Once the fire-escape roof window is locked, both in-flow and out-flow can be kept maximal. Obviously, the basement entry has high powered fans that are put on as soon as the alarm rings in the basement. If the crew enters a smoke filled fire-escape unit, they immediately get to the opposite side of the fire-escape entry that is better aerated (however, passing through the 'spray room', most of the carbon dioxide of the smoke dissolves in the intervening water spray). It is also advised that the stretchers of fire-victims are not kept about the floor level of the basement, there being designated higher level for their resting and immediate resuscitation, in the farther end of the basement.

The inverted J terminals of the off-site tubs—either tub of the off-site modular is constructed with a chimney to the exterior (with also an inverted J terminal to the chimney). The residing crew in the off-site modular is in no danger, as each tub of the modular is in an enclosure with an air tight access door. The J terminal of the chimney of the lower tub is long to be opening into a deeper level of the ocean waters, so as the incoming gas/smoke will escape into the ocean (carbon dioxide is highly soluble in water having extreme affinity to its solvent, its diffusion and solubility coefficient being 20 times more than that of oxygen), and not otherwise sucked into the nearby air tubing of the higher tub, and to therefrom flowing back into the rig's fire-escape unit.

Additionally, it can be improvised that the basement is constructed with a 'gas-escape' annex at a lower level, to be accessed through a floor door entry, the annex structured at the opposite side of the basement entry. It is implied that the basement has a separate smoke and gas alarm activated by local accumulation of either, such alarms located at a different site with different color lighting and ring tones. Wherein a local gas alarm is ringing in the basement along with the smoke alarm, the crew should get into the annex, as air is suctioned in through the tub at a higher level, and suctioned out from the one lower, while both elements of gas and smoke are forced to get out through the latter. The entry of the annex is safe-guarded by high powered fans that are facing towards the basement entry, and are put on as soon as any alarm rings in the basement.

The canisters of soda lime—in the event that the air tubing is dysfunctional upon a rig fire, up to $9/10$ th volume of oxygen from the cylinders can be let out in spurts into the fire-escape unit (being deemed safe, in case the basement's local gas alarm is not ringing, and there is no ignition spark in the basement at this time and later, only canned/uncooked foods being eaten), as the carbon dioxide is absorbed by soda lime within the canisters (boxes with perforations) kept in reserve in the basement, the sealed containers of the canisters at this time opened, the latter done even when the air tubing functions but there was smoke effusion. It was earlier noted that soda lime is a mixture of sodium hydroxide and slaked lime (calcium oxide or calcium hydroxide).

FANNING COVERS—for the extreme complexity of a rig, no single emergency measure addresses all the structural diversities that are expected and encountered. For that reason, multiple devices to be fitting for any one of the diverse structures and encounters are herein described. At times, it is the dramatic befall of catastrophic events that preclude any protective measures coming to the rescue. An explosion accompanied by fire, can be such an event, when rising inflammable gases on fire, surround the large and tall structures of the rig. Their fire-protective jackets that are instantly made wet, can be a saving measure to some extent. Additionally, as 'gas chasing' measures, all tall structures of the rig can be screened by a steel grid of scant exoskeleton (with or without conforming to their structural locomotion), wherein suitably sized fans (that are instantly turned on upon a fire/gas alarm) are scattered in strategic positions to blow away the gases approaching from the direction of their source. The fans with minimally sized stems solely face the direction of the rising gases about the source, and are made of light weight metal, wherein each blade tapering like a spike spans at least five feet length (two blades being functionally optimal). The fans drawing-in air from the opposite direction at the outset of the event, force the lighter inflammable gases to rise to the sky, and not to spread sidewise. Said grid of frame additionally has powerful sprinklers all through, drawing water from a deeper level of the ocean. Tall structures with significant locomotive function, and structures like rig cranes with telescoping towers, after they are wholly deployed, can still have such fans and sprinklers appended to their exterior, said appended structures initially to be removed upon their future time of dismantling. The taller structures not to tumble down either onto the permanent base, or into the ocean about the immediate vicinity, is of utmost importance for multiple reasons. For similar reasons, the arch curtain of fans as described below, can be additionally protective.

FANNING CURTAINS—it can be a saving provision for the rigs to additionally have a curtain of high-powered fans (structured as in the foregoing) in a tall arch of metal grid (to be erected as tall as necessary) rising from the sea, and spanning from one side of the rig to the other (preferably over the fire-proof corridor 110 of the DIR), shielding the rig and its tall structures from the side of danger. The high arch is supported by strong metal/concrete base structures, the latter with top air capsules, situated beneath the water surface. Said base structures are restrained in place being affixed by bolting hardware to the cross bars about the legs, said cross bars materially having similar sturdy structuring as the legs. Said restraining bolting hardware are multiple and sturdy, with no fear of dislodgement of the base structures with air capsules, otherwise leading to a collision injury to the legs. Periodic security check is worth recommending. Said air-capsuled base structures should remain under water, as significant heat can blow up their air capsules. The arch of frame additionally supports powerful jets of sprinklers, not letting the gas/fire by-passing them, towards the rest of the rig. The tall arch will not preclude the DIR from steering away, as its course is towards the opposite direction, whereas its tall structures are protected during the few minutes it is preparing to be detached. It best serves the purpose if the arch not only passes over the rig, but also through the rig, which, obviously can be done easily during the constructing of a rig, unless a rearrangement is done later. Though all the structures herein mentioned can be appended to the existing structures of any type of rig, as mentioned, they are best suited for new rigs, as the disposition of the taller structures and the fanning curtain itself, need to be carefully planned.

PROTECTION OF ROOFED/CLOSED ENCLOSURES—the enclosed structures within the rig have no known or easy means of countering provisions, in the event a gas-fueled fire engulfs in an instance. To minimize the catastrophic consequences of such an event, a rig should elect to have roof-outlets spread all through the roof structure, rising few feet high as inverted J structures, to let off the lighter inflammable gases. They protect the people occupying the roomed enclosures. The rig should additionally have a circuiting of air-tubing traversing through the bottom level of all the rooms, and extending further to its open areas, said circuit of tubing drawing air from the utmost bottom of the air gap, about the safe side of the rig. The flow through the plurality of tubes drawn from the air gap is made maximally forceful upon a gas alarm, to be a powerful gas-chaser from the roofed/closed enclosures, by quickly filling their interiors with up-rising air. In conjunction, the up-tilted fans located about the bottom level of the room, can further aid the gases to ascend to the roof, or not enter the room altogether, helping the fire to cease. In the case of the DIR (with no air gap), a circuiting air tube situated about the safe side near the steering station, courses few feet vertically underwater, to then turn towards the steering side in an incline, to rise to the surface at a distance, the terminal of the tube having locked air capsules, to naturally stay afloat. An inverted J tube appended to the terminal always stays in open air, despite rising tides. The air tubing need no severing when the DIR is steered away, though they may need to be detached when the DIR needs to be positioned upon its return. The air-tubing about the safe side of a rig and coursing down towards the sea, are in a number proportional to the size of the rig. For security purposes, all the devices are monitored by a drone, and checked periodically to ensure a maximal functional state.

Special Features of the Rescue Boats for the Off-Shore Rigs

The herein devised life-boats and or lift-boats are not accessories, but are invariable aids in the rigs without: a basement with an in-situ fire-escape; an in-site fire-escape modular.

The Life-Boats

Most of the life-boats 138 are stationed in the DIR adjacent to the spray room 197 (FIG. 1). A life-boat has the following special features needed of its intended purpose: a fire resistant surface, bottom wheels like those of a train-wagon, and two hanging ladders on one side, the side also having intervening black stripes to be identified as the side to be approached, while the whole boat is painted white, for enhanced visibility; the boat's hemi-section on the opposite side of the ladders having thicker weight wood, preventing toppling of the boat with the weight of a 'rescued' climbing up the ladder, or alternatively, having Velcro bound centrally situated helium sacs in the boat interior that are secured to the ladder side before boarding, to be replaced back, thereafter; raised rubber-guards, strong but yielding, scattered about the boat's exterior preventing collision injury, the boat also having multiple large ringed structures about the exterior for needed maneuvering; water tight compartment storing rescue-supplies (analgesics like Tylenol which is acetaminophen/paracetamol, hospital-gowns, dressings, 1-2 sets of IV transfusion bags); secured oars, and a snapping joint to an anchoring metal chain to disconnect the boat from the rig; a solar-powered light put on by remote control upon a rig-fire happening after a nightfall; a built-in break resistant lighted compass (a GPS connection is a future option, as the rigs, not being far away from coast line, should have a dedicated GPS line to direct the lost crew members in ocean waters, to the rig, to the off-site modular, and to the shore), as at least a compass directs to the north and south, and thereby to the east and west, to reach the coast line and not be lost farther into the ocean waters until the break of the dawn hinting the directional geography, however, a compass is only a rough guide, and reaching an inhabited and non-rural coast is paramount if a fire victim is boarding a boat, and conversely, reaching an uninhabited coast can be the beginning of endless troubles both for the search team and the strayed crew member(s), making it clear that aiming to reach the off-site modular is in fact a dire necessity, wherein a guide-light is indeed the best guide.

The boat-exit from a conventional jack-up rig—the conventional jack-up rigs are set up higher with an 'air-gap', and letting out the boats in an emergency is a challenging proposition. There must be a plan for their smooth and safe exit instantly, by mere click of a remote control. It is implied that the boats are built in the manner devised herein. If not, at least the wheels as herein devised, appended to existing boats should not be felt as a hardship, for the reason, moving a boat without is a hardship by any standard. The wheels can be affixed to an exterior frame work with no concern that a boat's integrity may be compromised by a wheel's hardware piercing to the interior.

There are rail-road like tracks starting from the deck and reaching the ocean surface, the tracks structured in an air-tight 'ocean-tubular' with fire-resistant surface, covered by 4-5 layers of burlaps. It has spray-poles inside, feeding water to the self-bathing surface sprinklers outside. The 'tubular' is supported by vertical cross bars, the latter supported by bottom horizontal metal-beams extended from a leg. The 'ocean tubular' and the cross bars impose no strain upon the leg, as their bottom horizontal metal beams are firmly affixed by multiple bolting hardware to large bottom extensions of air-capsuled metal-blocks underwater that are also immovably connected to each other, their size proportional to the weight they need to support. All the appended structures and their anchorage are materially similar and sturdy as a leg.

The rail-road like tracks within a down sloping tunnel-like interior of a deck run parallel to its walls, wherein the boats with train-wagon wheels, stall in a row. The tracks make a smooth L turn as they exit the deck. The deck and the ocean-tubular has hand-rails running on either side of the tracks so that the boarders can hold on to slow down or stop the course of the boat during the downward sojourn, by also swiftly anchoring its chain to the hand-rail. The grooves of the boat wheels are deep set, with no danger of derailing. Each boat is restrained by side chains that the boarder disengages after boarding, to mobilize it on the slope, with also a push if needed, while he is firmly gripping the hand-rails, being also careful to maintain the needed distance from a preceding boat. A boarder wears fire-proof attire stored in the deck. Large fans about the tubular exit face upwards to blow off the lighter inflammable gases. The tubular exit is closed normally by car-garage like air-tight sliding closure, its lower indentations for the tracks also made air-tight, however, the tracks may terminate short of the sliding closure. The deck is modified into a spray-room, with no availing space for its structuring within the rig, the latter also not having an in site fire-escape modular for similar reason (it is presumed all the rigs have a deck as a boat-stand, to which the ocean-tubular can be appended), and the 'track drives' or the 'spray drives' are driven to the 'deck, to safely exit in boats. These rigs must invest in an off-site fire-escape modular in the least, as a destination for those so evacuated. The boats' surfaces have raised rubber guards to protect against collision injury. Similarly, the terminals of the ocean tubular and the legs have firm but yielding rubber-guards (with fire resistant covers) about the ocean surface that are structured to be submerged. To return the boats to the deck, a group work is needed, some leading the boats directing to the 'ocean tubular', whereas some other drawing them by chains upon the tracks. Each boat thereafter, as before, is restrained in its destined position about the tracks. If the boats have regular wheels, their tracks have to be carved on the floor or a path defined by closely-set side rails, or else, un-boarded, they are maneuvered throughout their course (yet initially chained in a row).

As an alternative thereof, all the boats can be stationed on the tracks, wherein the first boat is stopped by a cross bar that moves horizontally in and out of the track, to stop or let out a boat. Upon a click of a remote control, the cross bar moves out of the track to let out a boat, and moves in after its passage, to hinder the boat behind, unless there is another click, to allow its passage. A boat's sloping front and back creating a sufficient gap between each boat allow the plan to work as in the configured manner. The boats not restrained by chains is an added advantage that they are also released from outside. The deck being locked, and only the crew are the boarders from inside, a button next to the cross bar can also be pushed, to let out the boats. Additionally, consequent to a catastrophic event, the exit door is kept unlocked for the crew to get out easily. A water proof 'remote' having controls to the exit door and also to the 'let-out' cross bar, both put together, has to be carried by every crew member, in the event a boat has to be let out from outside.

A boat exit from a DIR—in a DIR, the boat enclosures 125 (FIG. 1) facing the ocean side, have the following safe exit plan: the enclosures with down-sloping floors are triangularly devised about a vertical plane conforming to a 105° angle on the rig side, and a 30° angle on the ocean side, a down sloping roof conforming to a diagonal plane, wherein the rig side wall of the enclosure conforming to 90° angle about a horizontal plane; the boats are restrained upon the sloping floors, by the normally down-sloping roofs; the down sloping roofs conform to down-sloping ramps when completely slid into the ocean waters by a remote control; the boats on wheels thereupon unrestrained, can slide over the sloping floors and the sloping ramps, onto the ocean waters; the ramps have sideward ramp tracks (as 2-3 feet extensions of the down sloping floor) and strong but yielding rubber guards about the lower edge, to be 'shock-absorbers' upon a boat's collision.

Returning to the rig, a boarder should secure the metal 'fastener' chain to connect to the boat, and then enter the enclosure, wherefrom he pulls the boat onto the ramp into the enclosure. He hooks the boat chain to a wall so as to steady the boat on the incline, and the ramp made to retreat to its original roof positioning. The boat chain thereupon is loosely secured to the 'enclosure fasteners', so as to maintain its lengthier disposition. If multiple boats are let out when a DIR cannot be detached, even if not boarded, they stay afloat in water connected by the 'fasteners', and so can be salvaged, if not consumed by the fire. However, on most occasions, the boats are let out from a DIR after it is detached, but found to be unsalvageable.

In a different embodiment, the DIR boat enclosures approximate a rectangular configuration in a vertical plane (like a car garage with a sliding roof-door), but structured to having a sloping floor. From the boat enclosure rail-road like tracks (instead of a ramp) extend into the ocean waters, through indentations about the closed door, the latter made air tight as a whole. The boat wheels are deeply grooved (the 'staple grooves'), whereby their de-grooving may not be an anticipated concern while sliding upon the tracks lacking the rooming structuring of a ocean tubular extending to the ocean surface. While exiting, the boarder temporarily chains the boat until the door slides up sufficiently, after which the boat is released, and the door locked. Standing fans about the door blow off the approaching gases. This model, as also the one preceding, lets the boats out with or without a boarder. Wherein a DIR platform is too high, the model as for the foregoing jack-up rig can be elected for the DIR. Due to shorter length of an ocean tubular in a DIR with no air gap, horizontally or tangentially supporting cross bars from the side walls of a DIR are appropriate and reliable. This later model as in a jack up rig model, has an added advantage that a single exit is secure, as also can be easily closed, when the DIR is stationed.

The Lift-Boats

In addition to the life-boats, the rigs are equipped with 'Lift-boats' devised for lifting the 'severely injured' from the ocean waters, the lift-boat otherwise having the general features of a life-boat. Though a victim can be pulled easily underwater, lifting him is harder, as once the victim is above the water surface, the weight in air comes into effect, and additionally, the 'rescuer' has no solid footage to bear even a moderate weight. A person may tilt a boat down to roll-in an injured but conscious victim, and then straighten the boat for himself to get in, if a boat has a sloping base, but with the 'flat-base configuration' of a lift-boat, it is hard to accomplish.

THE LIFT-BOAT IN A HAMMOCK MODEL—the FIG. 9A illustrates the schematic model of a lift-boat 500, better devised to be larger than a life-boat (however, having similar general features), so as more than one person to be nursed, can be accommodated. Its flat bottom additionally ensures stability and thereby an undivided attention of a rescuer, if the ocean waters are turbulent. A cut-section in part 518 of one side of the boat interior depicts such flat based structure. A life-boat has four wheels as those of a train wagon, and it has rubber-guards scattered about the exterior contacting areas. The boat comprises of a lift-hammock (LH) 502 on one side of its exterior. The LH 502 is structured to have a pouch-shaped bottom hammock 504, anchored by one of its sides, to a flat panel 528 of the lift-hammock (LH) 502, the latter wholly made of a network of fiber material similar as a burlap. The pouch-shaped bottom hammock 504 additionally has a double layer of burlap sheet lining its both sides, with a metal-wired reinforcement in between.

The barge structuring and the boat window—the lift-boat comprises of a flat board like barge (1½ foot wide) on either side, wherein on one side, the barge (the 'rescue-barge' 542) having provisions of belt-buckling a 'rescued' fire-victim, the flat panel 528 of the lift-hammock 502 being attached to the edge of the 'rescue-barge' 542. The flat surface of the rescue barge 542 is structured with a ramp like incline (with a mirror image incline about the interior) so that the ocean waters may not drench the boat interior. Additionally, the outer edge of the barge 542 is smoothly rolled-in so that the rescued is stable over the ramped surface. The boat is structured to have the wheels outside the barge area. The boat-body about the rescue side accommodates a wide bottom-window 547, its two doors inside being water-proofed by their rubber-washer like edging, such edging sufficiently wide. The window 547 has no vertical central separation excepting a small central 'door-rest' about the top. The window doors hinged about the sides and moving towards the center, close by an optimal overlap, to be locked by a center bolt. Additionally, the window frame about the top and the bottom comprises of tight rotating closure pieces, at least 4 in number, each structured as an outwardly thinned double-wedge that is bolted in the center, the rotating closure pieces subject to securely shutting the window doors, the arrangement being similar but not identical to the closures firmly gripping the back panel of a (not too ancient) photo-frame on all four sides. The window door sealing is best configured in the model of a hinged dish-washer door that is 'sealed' to the washer compartment by a sturdy sheet, predominantly of rubber, set forth to be eminently water-proof with minimal technology. As an alternative thereof, water-proofing in any other conventional manner is also a satisfactory option, as long as it is unfailingly secure. The window area may be set forth to conform to a curvilinear shape to accommodate more length, or it can be a flat rectangular structure (like the window in a flat wall of a room), such non-curvilinear configuration being confined to the area of the boat window. The window being not too lengthy, the head side of the victim is brought in first, and the doors closed after he is temporarily rolled to the opposite side of the boat. About the barge on the other side, a locked built-in water-proof box with a small bullet-proof glass panel, stores the boat oars, a solar powered suction device, solar powered heating coils, and the medical rescue supplies. A key is chained to the lock, with a large key-hole glowing in the dark (to hint from a distance, the opposite side to approach with a burnt victim). Such storage facilitates spacious interior, while also balancing the weight of the victim on the other side. The rescuer after getting into the boat and unbuckling the 'rescued' on the barge 542, slides him into the boat through the window 547, by pulling a strong water-proof sheet covered by finely woven sheet of burlap, normally held in place by Velcro bindings about the underside of the burlap. The Velcro binding secured to the outer corners of the barge 542 are undone initially by the rescuer, after belt-buckling the 'rescued'. Inside the boat, the rescuer buckles the victim at two places, on a plastic sheathed bubbled air mattress. The boat 500 has solar powered lights inside and outside, with glowing on-off switches. If there are two rescuers with two burnt victims, the second rescuer can stand and wait about the lift-hammock with the victim, while the first one is being settled in, the hammock built strong enough to hold 2-4 people at a time, with its height limited to four feet.

The barge 542 is equipped with appended structures to non-traumatically board a victim, as only one hand of a rescuer is free, and laying down onto the barge an injured/unconscious victim who is hanging on in a vertical disposition is not an easy task without some physical aids. Such aids and the concerned maneuvers include: (1) the lift hammock 502, secured in a zippered enclosure underneath said water-proof sheath on the barge 542, to be pulled out by unzipping (its two large zippers amenable for easy handling and coming towards the center, however they may not close completely, the partly enclosed lift hammock 502 being affixed to the edge of the barge 542), the hammock pouch 504 with metal wiring immediately getting under water, for the rescuer to stand on it; the 'rescued' is initially supported on the hammock 504 before being lifted on to the barge 542 by the 'rescuer', while the flat panel of net 528 providing needed hold for both; (2) a strong but soft air-inflated neck-chest harness to the victim, suitably structured, to bind him as follows: first the rescuer fastens a chest harness, 4-5 inches wide, its Velcro binding secured under an appropriate arm pit, so as the air-inflated part runs across the chest; the center of said inflated part comprises an attached neck harness to go around the neck, to then come to the front, to be fastened to the opposite side of the neck harness by a Velcro band, the neck harness structured like a neck collar, also having an air-inflated front part; the Velcro fasteners are provided with bag like plastic wrapping (with easily expandable elastic closures), so as the Velcro's loops and hooks are not opposing, as it is not always possible unhooking a Velcro with one hand, a mock practice on a manikin to carefully yet swiftly fasten a victim, being beneficial; if the neck/chest area is burnt, the fastening must be lax as also the fasteners are cushioned inside; the head and neck of the victim can now stay afloat, and having gained a firm footage, the rescuer lifts the body of the victim onto the barge 542 for belt-buckling, the redundant length of the belt going around one leg; the neck-chest harness is unfastened just before the 'rescued' is pulled into the boat; the neck-chest harness is secured in a zippered burlap case, so as the fire spreading on water may not burn it, however, fire on oil-laden water is a later event, as also the boat is getting out of the ocean tubular with its terminal located outside the imminent danger zone; the burlap pouch of the neck-chest harness is positioned about the left side of the barge, as when the rescuer approaches the barge 542, being a suitable location for the needed maneuvers by a right handed person.

There is additional matter to be noted: (1) the boat interior is set forth with a lowered incline towards one corner wherein the nozzle tip of the suction-device is positioned in its frame, soon after the rescuer gets in, as also the suction is put on; the suction's water outlet is devised to be pouring into the ocean, its terminal dipped into ocean waters; the boat interior is covered by a waterproof surface sheet for the water to drift towards the lower corner; (2) the boat adjacent to the interior ramp is equipped with a fixed yet removable hard board, for a victim's immediate resuscitation; (3) the barge 542 on either side being only 1½ foot wide, the boat 500 can be still steered with the oars in an incline; as an alternative thereof, the front $\frac{1}{3}^{rd}$ of the boat 542 can be made barge-free, wherein the front wheels are big and the back wheels are minimally sized and positioned adjoining the hind terminal; however, it may be noted that a single rescuer while caring for the victim, the boat steers its own course provided it is out of the danger zone, the rescuer steering it as when his hands are freed, the guide-light directing him at this time to the off-site fire-rescue modular.

A LIFT-BOAT WITH INFLATED LIFT-MATTRESS—FIG. 9B shows a vertical end-on cut section of a lift-boat 570 with a burlap sheathed air-inflated 'lift-mattress' 572 that is positioned adjoining the right side 571 of the boat. Unlike a typical mattress, the lift-mattress 572 comprises a wedged configuration. Its side 587 configured flat and resting in an incline is facing the adjacent 'receiving mattress' 582, whereas its side 583 configured concave is positioned adjacent to the boat side 571, while its top horizontally positioned side 573 is also concave. The lift-mattress 572 is anchored to the edge of the boat side 571 at two places, by burlap ropes 542, positioned in equidistance from the center of the side 571. A burlap sheathed air-inflated receiving mattress 582 is positioned adjoining the opposite side 548 of the boat, the receiving mattress 582 in its cut section resembling an end-on vertical hemi-section of the boat, except that the top is ramped rather than being horizontal. Such configuration is well appreciated in the boat as it is depicted in the right side of the FIG. 9B, wherein the boat 570 illustrates the mattresses 572 and 582 as in the manner they are repositioned by the rescuer, whereas in the left side, the boat 570 depicts their original positioning upon an initial encounter by the rescuer. The side 583 of the lift-mattress 572 has buckling belts 574 and the side 584 of the receiving mattress 582 also has buckling belts 541, and both mattresses are configured to be light weight. The boat interior has a padded hard board 581. The rescue side of the boat has identifying black stripes, whereas the whole boat is painted white.

The rescuer upon approaching the lift-boat 570 with a rescued, lifts the lift-mattress 572, from within the boat by holding the wide eye-lets that the lift-mattress 572 has on its burlap sheath throughout, and inverts the lift-mattress 572 onto the ocean surface, so as its concave side 573 abuts the exterior of the boat side 571, and the concave side 583 conforms to a ramped sloping top, while the horizontal side 587 floats upon the ocean surface 164. The rescuer thereupon spreads out the unbuckled belts 574, pulls out an attached fine burlap sheet from the zippered mattress edge 576 of the lift-mattress 572 and inverts it onto the ramping top 583. Soon after, he adjusts the thin mattress edge 576 to position the 'rescued' onto the lift-mattress 572 to then roll-in the edge 576 for the 'rescued' to slide inwards, wherein he is belted at two places, the redundant belts going around an arm and a leg, both the belt buckles being positioned about the boat side. The rescuer gets into the boat thereafter, and positions the receiving mattress 582 to abut the interior of the boat side 571, so as, the side 584 with the buckling belts 541 conforms to a ramping top that inclines down to the boat interior. To start with, the 'rescued' is unbelted about the head side, and his head and torso are slid onto the receiving mattress to be belted again in place, by the mattress belts 541. Following that, the leg side is similarly slid onto the receiving mattress 582 to be belt-buckled, the buckles positioned towards the boat side 571. Following it, the rescuer unbuckles the belts 541 about the head side to slide down the 'rescued' upon the belt 541 onto the padded hard board 581, and he then slides down the leg side. To accomplish the fore going, the rescuer may grip one end of the belt 541 with the buckle under his foot, to keep the belt taut, so as to use its 'incline' to slide down the 'rescued'. The rescuer should be aware of the maneuvers to perform them in a swift secure manner. The mattress 582 can also be hung out about the boat side 548 to create room inside. Metal chains normally restrain both the mattresses with snapping closures about the boat side 571 that are secure yet can be easily undone.

The instant lift-boat model is best suited for old boats wherein both the mattresses can be appended easily, whereas the foregoing hammock model conforms to newly built lift-boats.

Multiple air pillows, IV (intravenous) transfusion fluids (vital in burns cases), hospital gowns, breathing aids, analgesics like Tylenol (acetaminophen or paracetamol), and dressing supplies are stored in a water proof lift-boat compartment. The boat wall has hooked rings structured as 'near circles' so that a hung infusion may not be easily disengaged. All crew members learn to do an IV line in the incorporated basic life support (BLS) training, while they are being trained in basic fire-fighting, as it may be a long wait before EMS takes over.

Extra Provisions to the Boats in Icy Zones

The fire engulfing the rigs situated in extremely cold and icy zones is not unheard of, as a gas entrainment with rig-fire can happen despite freezing climate. There can be seasons when there are blocks of intervening ice amidst ocean waters that can make the course of a boat formidable. For rigs in such icy zones, it is beneficial that the boats have additional provisions that are simple yet structured to surmounting the known obstacles.

As in the foregoing, the boats in these rigs are devised with train wagon like wheels, for safely exiting the rig, as also in any one of the modalities already detailed. In any case, the boat's wheels should have an additional provision of rotatable pedals (in the model of a bicycle), structured inside the boat to be hand-maneuvered, whereby the boat can still continue its course over the solid blocks of ice amidst ocean waters. Unlike a foot pedal, a hand pedal is eminently suitable for a full revolution, and hence is functional singly. With hands stretched out, a person is capable of maneuvering two pedals to move both the fore-wheels. The wheels however are located higher up, in a manner that they are not blocked by the encountered solid zone, the wheels exceeding the lowermost part of the boat's minimally scalloped bottom only by 2-3 inches. When the solid zone is encountered, pedaling the front wheels should also pull-in the rare end of the boat, with the high-set hind wheels not being caught up by an otherwise overhanging edge of the ice. The movement of the boat is slower by hand pedaling, but worthwhile, to pass the obstacles. Wherein two people are boarded, the hind wheels can also be pedaled, and for larger boats, more than 4 wheels can be optional. Should there be a thicker block of ice blocking the boat's movement, a boarder is required to manually pull the boat holding the large ringed structures that are appended to its fore part. He gets into the extreme fore part of the boat and sets out one foot on the solid zone while holding a ring of the boat, and then gets out completely, whereby the boat may not drift back into the water. The boat oars comprise of shovel-like pedals with sharp metal edges, as such design is otherwise helpful to break the ice or shovel the snow, either of them occasionally necessitated.

THE VULCANIZED RUBBER—all the rubber washers and assembly devices of rubber incorporated in the rig tubing, in the water tight sealing of the basement's fire-escape entry, and such other, are made of vulcanized rubber, the only type that resists the degrading attack of the petroleum analogs.

THE INSTANT JOINT CONFIGURATIONS AND CLOSING CAPS—the invention further envisions a model of tubing, and methods of instant system joining or closing, for all future units, or as a replacement-tubing for existing units. Said tubing is structured to have a deep threaded configuration on the inside or the outside, traversing the entire lengths. Inner threading is better (though manufacturing is more involved). The threading of the tubing, small or lengthy, to exemplify, can encompass the well and its vicinity, the rig, the air tubing, and the appended tubing structures of costly equipment (the list being not exhaustive), facilitating instant joining or closing of a compromised or broken system, aided by means of: (1) 'Instant joint-structures'—these joints are devised to be shaped as I, T, J, L, C, U, Y etc. with similar inner or outer threading as the tubing itself, to be inserted for system joining wherein a conduit line is broken. The working of the 'joint-structures' conforms to a 'sliding screw', aided by two or more 'conjoining' I shaped tubing with complimentary threading about an opposite side. The 'conjoining' I tubing are subject to have their threaded outer diameter smaller than the threaded inner diameter of the involved tubing system and devised 'joint configurations'. Wherein a conjoining I tubing alone is suffice, it is inserted all by itself, as a 'sliding screw'. The functionally uninvolved middle part of the 'joint-structure' is enlarged externally for handling even by robotic maneuvers; (2) 'Closing caps'—the closing caps have complimentary threading to their stems (to be configured with a smaller dimension and outer threading, wherein the tubular system has an inner threading), for closing a system, as when system joining is of no option. The functionally uninvolved external part of the stem terminal enlarges to double the size or more, ending in a sturdy and massive closing cap, to resist enormous pressure at times exerted by the tubular system at the terminal, and the massive cap with similarly sized distal stem is amenable to robotic maneuvers. Simple closing caps with complimentary threading are subject to be used to temporarily seal one end of a severed tubing while the other side is worked on.

How to find the source of gas/oil leak and mending it—about the oil-tubing of the rig confines and outside, oil/gas sensing 'equipment' are placed in equidistance, each numbered, defining its territory. Wherein leak occurs following a tubular damage, its territorial equipment rings its alarm first, though other alarms ring later, as the leak spreads. The devised computer soft-ware notes the timing, however, the one that first rang, is the source (unless the leaks are multiple). The leak is confirmed by the adjacent alarms that rang immediately following. The computer sets forth the chronology, for an instant information. The security crew familiar with all the numbered territories, should emergently deploy the instant joint structures. The 'production tubing' within the well has its own pneumatic plugging device, the 'Emergency Plugging Oil Conduit' (EPOC), disclosed in the original application (U.S. Pat. No. 9,175, 549), deployed after a well blow-out with oil leak (to be done when the oil-leak is a mere spill). The 'joint structures' being fixed in dimensions, the length of the tubing to be severed should be properly configured. On the other hand, as the minimal length of a damaged tubing to be severed cannot be minimized any more, the number of the joint structures (with one or more 'conjoining' I tubes) are to be properly configured before severing the tube. The I configurations are structured as both 'joint-structures' and 'conjoining tubes', the latter with complimentary threading. The leak is insulated first, and the tubing including the I tubes to be inserted, are articulated outside, and then the damaged tubing is cut, for the 'articulated set' to be inserted. One cut end is temporarily closed by a simple cap, while the other is worked on. The final manipulations of the two or more conjoining I tubing are done in-situ, to establish a conduit line, with vulcanized rubber washers also, for a fluid-tight closures. A distorted tubing may need an intervening U/C joint. A bent L-shaped curve needs an L-joint, whereas a complex interconnection needs a T-joint. The crew must have a mock practice of possible maneuvers. The 'joint-configurations' can conform to two designs—'subtle' or 'striking' ('Sub' or 'Stri'). In the 'subtle' configurations, the devised curves are less obvious.

Unceasing oil/gas emission from a source that cannot be detected/mended is the cause of an unceasing fire, or else for an uncontainable pollution of the eco-system. Hence, such structural mandate is as important as all the other security measures put together. Moreover, what needs to be herein implemented is only a small step forwards in means familiar, however, with a big leap thereof, in the remedial functions achievable.

The time old wisdom says: 'The time and tide wait for no man !'

A 'tide' in time may save a man or men, and then some more.

The invention claimed is:

1. An embodiment of invention directed to prototype fire-escape models of off-shore rigs with an emphasis on a Detachable Island Rig (DIR), said DIR reversibly locked to a roof platform of an under water basement is being mobilized by a 'steering crew' to be salvaged upon a rig fire, wherein the under water basement serving as a fire-escape for the remaining crew is 'water-sealed' upon a rig fire, the fire-escape scheme of the DIR and the off-shore rigs having the below set forth means and methods:

(a) provision to instantly lock/unlock by a locking device to be disengaging from or engaging with a completely submerged permanent base structure comprising an underwater basement and an overlying basement roof platform, wherein upon disengaging, the partially submerged DIR separating from the roof platform and adjacent stationary-rig structures of: (1) a conduction platform with an appended segment equipped for immediate operations; (2) a fire-station; (3) a 'general-purpose' basement entry structure away from the conduction platform; and (4) an intervening stretch of fire-proof corridor conjoining the DIR and the conduction platform, wherein traversing metal tubes and electric wires of the fire-proof corridor are being instantly disconnected for disengaging the DIR, as watertight doors of both the corridor and the DIR are shut, and a short watertight walkway between both is being disconnected, (b) the DIR with a working platform sufficiently high to be untouched by rising tides, has in its overall structuring: provisions for restoring immediate functions of the conduction platform, tall and hefty equipment, working quarters and working devices, optional living quarters, boat stands, a 'fire-escape' entry structure about a spray-room with encompassing accessory provisions, a security monitoring and response station, a metal bottom of air capsule imparting reversible buoyancy to the DIR, a bridging structure to a general purpose basement entry, the standard rig equipment known to the industry, and at the farthest end from the fire-proof corridor, a steering station having powerful engine to smooth steer the DIR in an automated straight course following a remote signal by the crew, (c) the DIR having its own fire-station and crew of fire-fighters, as in the stationary rig of the permanent base structure, (d) the DIR incorporating locking devices about two sides, said locking devices designed to be allowing room for imprecision and operable by a remote control, the latter having a common button to each side in addition to locking an individual device, (e) the metal tubing passing through the stretch of the fire proof corridor conforming to a short segments of rubber tubing having an U or C configuration at the junction of the fire proof corridor and the DIR, to instantly disconnect, for the DIR to be disengaged, (f) the DIR having projectile omni-directional wheels facilitating a precise positioning about the base platform, (g) while stationing back onto the base structure built to stay submerged, the buoyant DIR is pulled down by cog-wheel motion of motors moving ropes of multiple double pulleys about the basement, the ropes passing through erected 'roof tubulars' structured to surpass surface waters, the buoyancy of the DIR mostly overcome by water filling the DIR's bottom metal block of air capsule, (h) the DIR and the off-shore rigs having room to store large sheets/rolls of burlaps in a roof structure, to be made wet and thrown on burning mechanical devices, said mechanical devices covered by burlaps and fire-resistant jackets with a water-proof underlay, (i) the off-shore rig having wheeled life-boats and lift-boats stationed about a deck to be lowered into the ocean waters in an event the rig catching fire that cannot be contained, (j) the DIR and the off shore rigs having additional novel provisions of safe-guarding unprotected interiors and exteriors of the rigs against gas-fueled fire, (k) the DIR and the off shore rigs having additional provision of multiple 'exiting slide tubulars' as fire-escape models from remote and upper level work stations, (l) the DIR having a device of general purpose entry to the basement, said entry houding 'water-sealed' upon a rig-fire, (m) the DIR and the off-shore rigs having a spray-room with converging spray-walks, or spray-tracks with track drives, or else simpler spray-drives, either device set forth to be conforming to old or new rigs, or rigs with no availing space, and (n) the DIR's 'in-situ' prototype fire-escape about the basement entry, by a devised 'water-seal' upon a rig-fire, serving as a schematic of a 'water-seal' for an 'in-site' fire-escape modular devised for a conventional jack-up right with an 'air-gap', and no provisions for a built-in under-water basement.

2. The model of DIR of claim 1, wherein the general purpose entry structuring to the under water basement, is as set forth below:

(a) the DIR's general purpose 'entry housing' is set forth to be situated in a basement corner of the DIR'steering side, (b) a bridging structure is being configured in a 'truck crane' model with a drivable truck positioned about the rig side, (c) the bridging structure is minimally inclined to be resting on an entry walkway about the entry housing, (d) a bridging platform of the 'drivable truck' is structured to be in level with the DIR's work platform, (e) the 'enclosed' bridging structure is covered with burlaps and self-bathing surface sprinklers, (f) the entry housing rising above water surface is set forth to having a sliding floor window in a staircase room, the locked floor window being water-sealed, as a surface structure is burnt upon a rig fire, and (g) the crane model of the bridging structure, not materially connected to the entry walkway about the housing, is instantly lifted from the walkway, as the DIR is steered away upon a rig fire.

3. The model of DIR of claim 1 (m), wherein the DIR basement is structured as an emergency 'fire-escape' unit, the fire-escape entry of said 'fire-escape' unit being devised as two different models, named as 'Holder Model' and a 'Moving Carriage Model', wherein said 'Holder Model' entry and the encompassing vicinity comprising the following means and methods
- (a) the DIR's 'holder model' 'fire-escape' entry is being protected by room like 'inner' and 'outer' enclosures around a rectangular basement roof window (BRW), wherein the BRW's locked window door is 'water-sealed' upon a rig-fire, whether or not the DIR is detached from the permanent base,
- (b) the 'inner' enclosure of four walls, structured as a DIR'staircase room (DSR) is being locked with/unlocked from complimentary structures around the BRW, the DSR up rising through a DIR floor window, is structured to be surpassing the surface waters,
- (c) outside the BRW, the walls of the DSR are locked in-situ with the permanent base in a model of a watertight closure of a car trunk, to be unlocked by a remote control, the DSR walls reinforced as two conjoining layers of sturdy metal, are being devoid of a roof structure, whereas the rectangular basement roof window (BRW) door when close, conforming to its floor,
- (d) the 'outer' enclosure made as a 'permanent' DIR enclosure (PDE), is set forth as a strong concrete DIR structure erected around the DSR, said PDE having: (i) sturdy 'holder' supports fixed to both the conjoining DSR walls about one of the lengthwise dimension, said supports conforming to a 'hinge' model of a car trunk closure: (ii) about the opposite lengthwise dimension, similar but lengthier holders pass through slit-like openings about the DSR walls, facilitating the movement of the DSR walls with 'holder' supports while unlocking from/locking with the base: (iii) the PDE is covered about the top by a two piece watertight DIR closure (DC) configured in a model of sliding 'car roof closure',
- (e) by a remoted control, the BRW is closed by two 'watertight' window doors in a 'car roof closure' model, sliding sideward from a reinforced basement roof structure, the top door being made of steel and the bottom door made of bullet proof glass,
- (f) the DSR of two similar inner and outer wall structures, is subject to independent locking about the base platform, the inner walls further more supported by threaded-in forging legs giving a tripod base, some legs attached above the level of the holders and some below, whereas the legs have rubber caps for a firm footage about the base,
- (g) a tub like 'basement sliding room' (BSR) structured below the BRW and sunken into a reinforced basement roof structure, is devised to be 'water-sealed' after the BRW is closed, whether or not the DIR is detached,
- (h) said rectangular BSR having sidewise windows about the lengthwise dimensions, the windows adjoining the BSR floor are se forth to be opening into adjoining down-going slides reaching the basement floor,
- (i) the lengthwise dimensions of the rectangular DSR encompassing originating sets of 'staircases and slides', either of the set conforming to a top 'staircase structure' fixed about the walls of the DSR, and a bottom 'sliding structure' fixed to the BSR floor, the sliding lower terminals reaching the BSR windows structured about the bottom of the lengthwise dimensions,
- (j) the devised hand rails of the top staircase structures of the DSR with locked-in air columns, are structured to be made light weight and buoyant, when the DIR is in open waters after it is being steered away,
- (k) said metal holders are being positioned in a 'downward incline' when locked about the basement's platform, while assuming an 'upward incline' when unlocked, wherein upon unlocking the lower ends of the DSR walls are subject to be withdrawn towards the bottom of the DIR,
- (l) the opposing walls of the DSR and the PDE below the level of the metal holders, are structured to having a conjoining watertight rubber sheath, isolating ocean tides from the DSR and the DIR,
- (m) the DSR's inner walls having horizontally coursing metal capsules of air about the lower ends, making the DSR buoyant and light weight while carried by the walls of the PDE in open waters,
- (n) the down-going slides reaching the basement floor are set forth to having adjoining staircase provisions, the top footage being common, whereas the devised widthwise staircase structure (WSS) about the DSR and the BSR being a provision for returning from the basement to the DIR,
- (o) a security guard communicating with the steering crew controls the flow about the basement entry, and following an announcement, the BRW is closed while the DIR is steered away,
- (p) wherein the DIR returns after it was steered away, and upon the DIR's locking about one corner, its further positioning is fine-tuned by 'alignment poles' erected about the devised 'pole tubulars' of four corners of the PDE, whereas the DIR positioning is being adjusted by its partially drawn out 'caster wheels' so that said 'alignment poles' furthermore pass through the 'pole tubulars' of the permanent base, whereby all the landmark locking devices including those of the DSR, conform to their original alignment,
- (q) even before the DIR is brought down from the water surface, and before the partial DIR locking, few of the 'fixed holders' of the DSR are held up by metal prongs, and following the alignment, they are pushed down, for the DSR walls to be locked with the base structure,
- (r) the basement fire-escape having 2-3 emergency exit doors, their outer structures configured to articulate with a water-tight 'stair-case tubular' emerging from a rescue marine unit, aiding to evacuate fire victims needing emergent treatment,
- (s) the DIR's under-water basement can be structured to better serve as living quarters, and as cooking and dining area, wherein: (i) an ignition source is eliminated about the upper level, whereas it is eliminated about the basement upon a gas/fire alarm ringing about the time as the upper level alarms; (ii) hydrogen sulfide being heavier than air, the basement is locked, the gas by its rotten egg's smell being detected about the source; (iii) there is provision for each crew member for a SCUBA 'diving equipment', to be getting out of an emergency exit in a diving mode; (iv) large canisters of 'soda lime' in sealed containers, upon unsealing, absorb accumulated carbon dioxide in smoke pervaded fire-escapes, and
- (t) the fire-escape units of the DIR and the offshore rigs receiving unlimited fresh air through air-tubing originating from an off-site fire-escape 'modular', the latter advocated for all types of off-shore rigs.

4. The model of emergency fire-escape entry about the basement of a detachable island rig (DIR) of claim 3, wherein the 'Moving Carriage Model' of fire-escape entry and an encompassing vicinity, are as set forth below (a) said model of 'moving carrier' comprising a stretch of staircase framework, is structured to moving up from the basement floor, rising through the basement roof window (BRW) and the DIR floor opening, to be nearing the PDE closure, the carrier's bottom wall windows subject to letting the crew into the basement, (b) in an ascended position of the carrier, the windows about the carrier open to staircase structures about the basement, wherefrom the crew climb down to the basement floor, whereas each staircase having only basement floor supports with no material connection to the carrier, the latter devised to be a moving structure, (c) in a descended disposition of the 'moving carrier', as when the DIR needs to be steered away, the carrier opens to the basement floor, (d) the BRW is being closed from the ocean waters by a rectangular 'water barrier' (WB) of steel erected around on the BRW creating an enclosure, the four walls of the WB articulating with each other and affixed to the basement roof platform by hinge-joining, the conjoining further reinforced on the inside of the WB by a rubber 'sealing' to the base, the disarticulation of the walls of the WB during DIR disengagement upon a rig fire being done by manual and remote controls, (e) the water barriers (WB) about the devised lengthwise dimensions (the lengthwise barriers, LWB), erected to be standing upright, conform to an inward movement towards the roof window, their outward movement beyond 90° being restricted by outwardly placed brackets about the basement floor, whereas for the devised widthwise barriers (WWB) attached to the base in a similar manner by a hinge-joining and a rubber 'sealing', some outward movement beyond 90° is possible, whereas moving inwards towards the roof window, they articulate with the sides of the LWB that are augmented to be sufficiently thick, and reliably waterproofed, (f) the 'water barriers' (WB) are disarticulated from each other following the BRW closure, and before DIR disengagement, (g) about the opposing walls of the LWB and the PDE, a water-blocking unit isolates and guards the normally open structure of the PDE and the BRW from unexpected rising tides of the ocean waters, wherein the PDE component of the unit running through the entire length wise dimensions comprises a linear block of rubber with a central indent into which a complimentary structure, also made of rubber, arising from the LWB engages, thereby creating a water-block, (h) about each widthwise dimension, two wedged structures about an inter-space of the WWB and the PDE create a nested configuration, wherein a rubber guard, by virtue of its smaller linear dimension, is manually inserted for a water-blocking closure, said different structuring about the WWB facilitating an outward movement of the WWB beyond 90° for a snapping closure with the LWB during an articulation, (i) before the DIR is disengaged and steered away, upon a remote control the two LWB are timed to fall towards the BRW to close as two doors of a room, where after the two WWB also fall to rest upon the LWB, the basement entry site encompassing this model being structured lower than the roof platform, whereby the closed WB stay in flush with the rest of the base, (j) when the steered away DIR returns to the base, the WB is restructured and water is suctioned out from within the WB enclosure, whereupon the BRW is opened, (k) an alarm provision following 'water rise' within multiple capillary suction tubes positioned about the rubber 'seal' inside the WB enclosure, signals a leak to close the basement window doors, for the sheeted rubber 'seal' to be replaced/repaired, and (l) the 'moving carrier' is lifted up and brought down by any of the following: (i) an elevator like device; (ii) a giant lift prong; (iii) a crane like structure (the carrier conforming to a spread out terminal of a crane); (iv) by a pulley movement, wherein the pulley ropes affixed to the carrier at the highest level are set forth to pulling down the carrier, whereas the fixtures at the lowest level, with the pulley maneuvering reversed, pull the carrier up, the operative motors and the sets of pulleys being different for either movement.

5. The models of DJR and the off-shore rigs of claim 1 (k), wherein the off shore rigs, to be safe-guarded against a rig-fire, are subject to having additional provision of 'multiple exiting slide tubulars' from remote and upper level work stations, their structuring as set forth below (a) 'exit' of the slide-tubular about a work station resembles a shower cubicle with high caliber sprinklers, and an inch of water stagnation about the floor, (b) a deeper sprinkler-free corner having a raised floor-entry to a lit-up 'slide-tubular' leads to a flat-terminal with a bolted water-tight door that stays open upon unbolting, (c) the slide-tubular comprising hand rails and occasional foot pedals about the sides, has a course punctuated by 'speed-breakers', wherein the flat-terminal hoards a lift-boat that a person can let out, whereas optionally the exit tubular can terminate into an in-site fire escape unit, (d) exiting people swim up to the shallow surface waters to be reaching the off-site fire-rescue modular, the ocean course warmed-up by heating coils at a deeper level, (e) the course of the tubular about the 'air-gap' is being guarded by multiple burlap layers with self-bathing sprinklers, switched on by an alarm, the sprinklers fed by tubing coursing within the tubular, (f) the tubular being incorporated as a modular, is secured to the legs by sturdy overlapping metal rods materially similar as the legs, whereas the underwater tubular and the flat-terminal having strategically placed air-capsules making the structures light weight, (g) in icy zones wherein surface waters are frozen, it is mandated that the ocean surface about the terminal is warmed up by heating coils creating a fluid zone, and a specially devised 'life-boat for icy zones' is being hoarded about the flat-terminal, whereas connecting the tubular to an 'in-site' fire escape modular being a better option, and (h) the model of exiting slide-tubular is used for a stationary fire-station of the DIR base, wherein the slide tubular curves by the edge of the rig, a lift-boat being a suitable provision at this terminal.

6. To put off un-controllable fire in a steered away unit of DIR, the bottom metal block of air capsule as in claim 1 (b), is water-filled to submerge the unit, wherein said air capsule and the encompassing structures are devised as below (a) a geometrically configured center of the DIR is set forth to comprising a symmetrically built room size metal block about its floor structure, (b) said air capsules comprising water let-in nozzles and windows in equidistance, their inlet-opening centered to the bottom of the air capsule, the windows being opened for emergent water-filling of the air capsule to sink the DIR, wherein fire is uncontrolled, (c) sinking the DIR without an undue tilt is being effectuated as follows—the devised four DIR quadrants are set forth to be constructed as per the functional needs wherein the weights of the quadrants are subject to be equalized by incorporating 'compensatory' blocks of weights, (d) to start with, a proportionally exact mass of DIR miniature model is being made, to add 'compensatory' weights about the devised quadrants to trial sinking without a tilt, said 'compensatory' weights in turn needed to be countered by the devised air capsule, for the DIR to be set afloat, said miniature model serving as a base model for all workable DIR models, (e) the crew getting out of the DIR by mobilizing the life-boats, as the DIR submersion is effectuated, (f) after the first extinguished in a sunken DIR, water is being evacuated from the bottom capsule while it is also air-filled to make it afloat, and (g) the manufactured structures of the DIR are made water-proof, and the utility compartments (including those of the living quarters) made water-sealed, said utility compartments additionally having provision for automated vacuum creation each time they are closed, the air within otherwise imparting resistance to the DIR submersion.

7. The models of the DIR and the off shore rigs of claim 1 (i), wherein the rigs have additional provisions to safeguard the devised interiors and exteriors of the rig against a gas fueled fire, their means and methods as set forth below (a) (i) the off-shore rig comprising circuiting air tubes opening about bottom levels of a roomed interior, said air tubes drawing fresh air from bottom 'air gap' about a safe side of a jack-up rig; (ii) in the DIR with no air gap, a large circuiting air tube about the safe side near the steering station courses down underwater, to then turn towards the steering side in an incline, to rise to the surface at a distance, the terminal of the tube having locked-in air capsules, to stay afloat, wherein inverted J tubes erected about the terminal stand in open air, despite rising tides; (iii) said air-flow being made forceful upon a gas-alarm, to blow away the inflammable gases through inverted J tubes clustered about a roof structure, the room's up-tilted standing fans further aiding to drive the approaching gases, (b) (i) the rig's tall and hefty structures comprising an outer metal grid of fans and sprinklers, to blow off the approaching gases skyward, the grid or the appended structures dismantled about the time of deploying the tall and hefty structures; (ii) the fans of light weight metal, comprise minimally sized stems, wherein each blade tapering like a spike spans five feet length, two blades being functionally optimal, and (c) (i) a tall broad-based arch of high-powered fans and sprinklers, erected to guarding the rig from the side of approaching gases, curves from one side of the rig to the other upon sturdy submerged cross bars of a leg, said cross bars having bottom air-capsuled metal blocks, to be imposing no strain upon a leg; (ii) in a DIR, the arch of high-powered fans and sprinklers course over the fire-proof corridor, the corridor additionally hoarding said high powered fans.

8. The model of a basement The model of a basement fire-escape entry of claim 4, wherein the schematic of the 'water-sealed' entry is operative for an 'in-site' fire-escape of a jack-up rig with an 'air-gap', said prototype 'in-site' model having the following means and methods (a) the jack-up rig based fire-escape entry about a 'spray-room' is subject to having a 'water-seal' created by an incomplete shell of 'water-enclosure', wherein said enclosure comprising: (i) a four-walled outer structure and a four-walled inner structure, either one having a bottom but nether having a top structure, with water circulating between the inner and outer structures, wherein said out structure having lower set walls than said inner structure; (ii) interior of the 'water-enclosure' comprising a top sliding room (TSR) in level with the floor of the spray-room, and a sunken water-seal room (WSR) below the level of the spray-room, the rooms separated by a floor structure of the TSR, said floor structure having a sliding floor window opening to the WSR; (iii) a down-sliding unit with a top structure, a bottom structure, and an intervening gap, is set forth to be originating in the TSR to be reaching the sunken WSR, traversing the sliding floor window; (iv) the sunken WSR accommodating an originating down-going curvilinear 'slide tubular' leading to a terminal underwater fire-rescue station, whereas large rigs can be comprising more fire-escape entry rooms and equal number of terminal rescue station, the fire-rescue station being a submerged modular; (v) a spray-room stair case, structured about the fire-escape entry, is devised to access the top structure of the sliding unit about the 'water-enclosure', (b) said curvilinear slide-tubular reaches an entry room about the fire-rescue station, said room having glass windows and a watertight entry door to the main rescue unit, (c) said curvilinear side tubular comprising: partitioned unit of multiple sliding structures; water feeders originating about deeper waters, and traversing a common roof of the slide-tubular; said water feeders filling the water-enclosure, creating an over-flow and a water fall about the lower-set walls of the water-enclosure; said water fall flowing into a surrounding tub about the water enclosure, where from water is continuously let out precluding its overflow, (d) the rescue station having provisions about an interior floor tub, to receive fresh air from a set of travelling air-tubing originating in an off-site fire-escape modular, (e) upon a rig fire: (i) each crew member has provision for a remote control opening the sliding window door about the floor of the TSR, wherein the opened window door automatically closes in few seconds; (ii) wherein a gas-fueled fire had spread to the spray-room, the top of the inner wall rising above the outer wall of the water enclosure is set forth to easily crumble in a devised small area, whereupon the water flows from the surrounding water-enclosure into the TSR, water-sealing its floor, the sliding window door, and the WSR, (f) the bottom WSR sunken below the spray-room, stands on a sturdy traversing structure that courses between one leg to another, and having metal supports materially similar as the legs, (g) the modular is being constructed with an air capsule about its roof to attaining buoyancy, imparting no undue strain upon the legs of the jack-up rig, whereas its top is structured with studded magnets, (h) the fire-rescue station is secured to transverse structures about two legs of a rig, by any mode of conjoined structuring, (i) the fire-rescue station having an emergency exit door:
  (i) said exit door opened upon an unexpected compromise to the rescue station, the crew equipped to exit with SCUBA oxygen cylinders; (ii) said exit door articulates with a 'staircase tubular' opening into a rescue marine unit above water level,
(j) the modular having a protective 'surface-guard' arising from the legs, and set forth above the modular all through its lengthwise dimension, to be obstructing and diverting a heavy falling structure upon a rig fire, with safe-guarding features, as set forth below: (i) the surface-guard has supporting chains to the legs, the chains having redundant length to be not taking the impact of a falling structure; (ii) spanning through its length, it comprises a surface air capsule structured to be larger about the leg side; (iii) it has studded bottom magnets, wherein the magnetic poles facing the modular are similar as the top magnetic poles studded about the modular, repelling a damaging contact; (iv) it is devised to let a falling structure tumble down into the ocean, sliding on its ocean side downward incline,
(k) wherein the surface guard had not resisted the weight, and had broken from the leg, it is yet protective to the modular, by: (i) resisting sinking by its buoyancy and its additional anchoring chains; (ii) maintaining the devised incline by the larger sized air capsule about the leg side, making the weight to furthermore drift into the water; (iii) repelling the magnetic poles about the top of the modular, whereby the weight may not be reaching the modular with an impact; (iv) its underwater disposition making all the falling objects lighter than they actual are, and
(l) a jack-up rig optionally having multiple exiting slide tubulars from work stations remote from a spray room.

9. The under water emergency 'fire-escape' units of the DIR and the off-shore rigs, wherein the rig's fire-escape entry is structured in a 'spray room' with converging 'spray-walks' as in claim 1 (m), the structuring of the spray room and the spray-walks, as set forth below
  (a) the spray-room comprising: (i) spray-poles drawing water from the ocean to be feeding roof and room sprinklers; (ii) a roof structure with a top metal sheet, layers of burlaps, layers of mattress-like sponge, and a bottom metal grid; (iii) wall structures protected by outward extension of the roof and the spray poles; (iv) a floor structure stagnating an inch level of water; (v) an entry door guarded by 4-5 oversized overlapping layers of burlaps and high-powered fans, hindering fire, gas, and smoke; (vi) a modified structuring wherein if work stations are isolated, multiple spray-rooms with multiple basement entries being devised, and wherein the work stations are in different levels, an upper-level spray-walks and spray-room being devised, the latter structured above the lower level spray-room with a connecting sliding structure, the basement entry being common; (v) provisions in rigs with no availing space for spray-room or spray-walks, to be having the boat-stand modified as a 'spray-deck', structured similar as a spray-room; (vi) safe guards wherein fire is not controlled in a steered away DIR, people in the 'spray-room' having provision to get into an adjacent deck facing a ocean side, to board and mobilize the life-boats,
  (b) the spray-walks structured about different work stations and converging unto the spray-room, having provisions as below: (i) the 'spray-walks' are structured with two walls, their entry doors not opposing; (ii) the spray-walks are being structured like a 'spray room' comprising powered sprays jetting water about the walk-ways and between the two walls; (iii) lit up floor arrows leading to the 'spray room' destination; (iv) the carbon dioxide of emanating smoke with high diffusion and solubility coefficient in water, is being precluded to enter the basement through the intervening spray-room and the spray-walks, whereby the danger of smoke inhalation is being greatly obviated.

10. A fire-escape modular improvised with all types of off-shore rigs, is configured as an 'off-site' fire-escape refuge as in claim 3 (t), wherein the 'off-site' modular having the following means and methods
  (a) the 'off-site' modular having a basement like room structure (BRS) and a towered top structure (TTS) above the BRS, wherein the modular exterior having: (i) a metal shielded wooden barge with sloping edges and hand rails in equidistance; (ii) a wide staircase structuring about the exterior of the BRS to be accessing a sliding door (SD) about the TTS; (iii) an emergency entry to the BRS with ramps about high set doors, (iv) a terrace about the TTS accessing the SD,
  (b) the metal SD about 5-6 feet height is structured to be sliding sideward into the walls of the TTS, the SD being locked by mechanical means and remote controls,
  (c) the BRS having: (i) an exterior covering of steel; (ii) air-capsuled metal block flooring set forth above the metal shielded wooden barge, ; (iii) bullet-proof glass windows with night vision video monitoring; (iv) helium sacs secured about the roof,
  (d) the modular lit by solar-powered lights, is being anchored to the bottom of the DIR basement, or to the submerged legs, by units of metal strings, structured as follows: (i) each unit having two strings, each string being made of narrow metal rods, (ii) the adjacent rods being linked by a metal ring, each ring in turn linked to a rod center of a paired parallel string, (iii) the strings thereby prevented from sideward bending or sinking, to be keeping desired axial length, precluding the modular floating closer to the rig,
  (e) the interior of the TTS having: (i) a spacious hall having bullet-proof glass windows for night vision video monitoring; (ii) a wide staircase leading to the basement; (iii) a high tower break-proof glass enclosure housing a large rotating high-beam flood-lights facing skyward, to be guiding lost crew members in ocean waters to the modular, the lights being put on after a fire alarm,
  (f) the anchoring units of metal strings having adjacently coursing heating-coils of solar-powered battery source,
  (g) powerful jets of water are set forth to be emanating about the edges of the modular, dissipating oil and fire about surface waters,
  (h) the BRS having unique security structuring, wherein: (i) the large helium sacs are being secured about its roof, whereby a swaying modular steadies upright upon ocean turbulences; (ii) the bottom air-capsulated metal blocks attributing buoyancy to be set afloat; (iii) the barge-structuring of the boarding platform off-setting swaying by giant ocean-tides,
  (i) wherein the modular is being structured on an erected leg from the ocean bed, sufficiently distanced from the rig, the modular having: (i) a barge-like base platform being accessible for a single rescuer; (ii) few rod attachments to the rig, to be anchoring electric heating coils; (iii) a high set BSR door entry having two ramped thresholds of differing heights, a higher set door being used upon rising ocean-tides, and (j) the off-site fire-escape modular having the originating air-tubing travelling under water, and reaching the fire-escape unit about the rig site, for fresh air-supply to be relied upon a rig-fire.

11. The fire-escape units of the DIR and the off-shore rigs receiving unlimited fresh air through air-tubing originating about an off-site fire-escape 'modular' as in claim 10 (j), wherein said air-tubing having means and methods as set forth below (a) a set of multiple air tubing originate from a tub bottom of the off-site fire escape modular, said air tubing comprising color-coded large sized rubber tubing each covered throughout by resilient metal tubing, either of the rubber and metal tubing having intermittent short segments of threaded metal tubing about identical locations, (b) as an alternative thereof, the set of air tubing merely comprising the resilient metal tubing having intermittent short segments of threaded metal tubing, (c) either model of air tubing structured with redundant length, travel under water to a rig's fire escape unit, to be entering through a tub located at a higher level about the opposite side of the basement's fire-escape entry, the air-tubing supplying fresh air to the fire escape unit upon a rig-fire, (d) the rubs at both ends fill with water, with alarms ringing about either end, consequent to structural compromise of the air-tubes, (e) to finding the leaking tube(s), the normally open 'injector caps' of the tubes are being capped about both ends, the water suctioned out from the tubs, and the 'injector-caps' about the rig terminal opened, (f) the leaking tubes keep filling the tub with water, whereinsaid leaking tube(s) is/are being tested with 'air-injection' with both terminals being capped, while divers inspect their entire lengths for emerging air bubbles, (g) segmental replacement of the compromised rubber/metal tubing is being done at the level of the intermittent short segments of threaded metal tubing, whereas replacement of an entire tubing being an alternative, (h) the fire escape unit about the rig comprises an additional set of an inverted J tubing emerging from a second tub located about the fire-escape entry, the tub and the tubing being devised to evacuate carbon dioxide of the pervading smoke, (i) smoke is devised to be let out or suctioned-out through the second tub located near the fire-escape entry, wherein a longer limb of the inverted J terminal of the air tubing terminates into deeper ocean waters, the carbon dioxide of the emanating smoke due to exceptional diffusion/solubility coefficient in water, being not subject to be returning to the atmospheric air, (j) the curve of the inverted J tube is structured to be rising to a safe height above the surface waters, and is being protected by layers of burlaps and self-bathing sprinklers, whereby the carbon dioxide from the fire-escape unit is being let out into the ocean, whereas the ocean water is not let into the tub of the fire escape unit, (k) fresh atmospheric air originating about the off-site fire-escape modular is being let in or suctioned-in through the tub located higher in the opposite side of the fire-escape entry of the fire-escape unit, and (l) the tub of the off-site modular is being structured in an air tight enclosure with a chimney leading to an inverted J terminal about the roof, wherefrom atmospheric air is drawn in to be diverted to the rig's fire-escape unit.

12. The boats of the off-shore rigs as in claim 9 (i), wherein the rig's life-boats stationed about a deck are operative in the event of a rig-fire, said boat-deck and said life-boats having special features needed of their functions, as set forth below (a) the life-boat having a fire resistant surface, train-wagon like wheels, two hanging ladders on one side, and a watertight compartment storing basic medical-rescue supplies for fire-victims, (b) the whole boat is painted white, having intervening black stripes on the side of the ladders, to be identified as the side to be approached, (c) to preventing toppling of the boat with the weight of 'a boarder' climbing up the ladder: (i) the boat's hemi-section about the opposite side of the ladder is built heavier; (ii) the boat having centrally situated helium-filled sacs in its interior, to be secured to the interior about the side of the ladders, before boarding, (d) secured oars inside, built-in break resistant lighted compass, and a GPS unit (the latter being a plan about a near future), and an instant disengaging snapping joint of an anchoring metal chain to the rig, (e) a solar-powered light source, to be put on by remote control upon a rig fire happening about a nightfall, (f) in a jack-up rig, a boat deck and a boat-exit being structured as below: (i) rail road-like tracks about a 'ocean-tubular' start from a deck to reach the ocean surface in an incline, the 'ocean tubular' supported by vertical beams from horizontal cross bars of a leg, said horizontal bars further supported by under water air-capsuled metal-blocks, imposing minimal strain upon a leg; (ii) the boats with train-wagon like wheels are being restrained by chains about a sloping deck; (iii) exiting the deck, the tracks making a smooth L turn, whereas sideward hand-rails supporting a hoarder about the sloping incline; (iv) the tubular having spray-poles supplying sprinklers about its exterior; (v) the tubular about an ocean terminal having up-tilted fans to blow off the approaching gases; (vi) the boat's exterior having raise rubber guards, while the terminal of the ocean-tubular and the legs having similar guards about the level of the ocean surface; (vii) the airtight terminal of the ocean tubular having a car-garage like down sliding closure, opening upon a remote control; (viii) wherein the boats are not restrained, a horizontally moving cross-bar letting the passage of each boat, by control from within or from outside; (ix) the deck is being made into a spray-room in a rig with no availing space, a 'spray-wheeler' driven to the deck for exiting to the destination of an off-site fire-escape modular, (g) in a DIR, the boat-exit is being structured as below: (i) the boat enclosure being made similar as a car-garage, wherein a sloping floor having rail road like tracks, the tracks exiting about the indentations of an up-sliding door, moved by a remote control from within or outside; (ii) with a moderately high deck of a DIR, the boat-exit is being made about a short 'ocean tubular' having supporting tangential cross bars about the DIR walls, the boats released from within or outside by a remote control, and (h) encompassing the rigs of icy zones, the boats having additional provisions to be maneuvering over solid blocks of ice amidst ocean waters, said provisions comprising: (i) rotatable wheel-pedals about the boat interior, two pedals at a time to be hands-maneuvered; (ii) the boat's high-set wheels exceeding a scalloped bottom of the boat only by 2-3 inches, whereby the wheels are set forth to maneuvering the boat from the ocean waters, onto the solid zone of ice; (iii) the boats having maneuvering rings, and the oars having shovel like pedals, said pedals set forth with sharp metal edges.

13. The boats of off-shore rigs as in claim 1 (i), wherein the rig's 'lift-boats' are operative upon a rig-fire, for lifting severely injured fire-victims from ocean waters, a 'lift-boat' in a hammock model, apart from the general features of a life-boat, having special features needed of its functions, as set forth below
    (a) said hammock model lift boat, comprising: (i) a flat base and a barge on either side, a 'rescue barge' of one side being structured for rescuing a victim; (ii) on the side of rescuing, the boat comprising a wide bottom window, said window being shut by two water-proof hinged doors attached about the sides, the overlapping window doors secured by a center bolt, and side bolts about the window frame; (iii) the window doors comprising additional water-proofing wherein sheeted rubber 'seals' the doors to the broad window frame; (iv) the 'rescue barge' is structured with buckling belts, wherein after unbuckling, the 'rescued' is being pulled into the boat upon a burlap sheet through the boat-window ramped on either side,
    (b) the rescue-barge having appended structures comprising: (i) a netted panel of lift-hammock having a metal-reinforced bottom burlap-pouch, set forth as a 'standing structure' to the 'rescuer' and the 'rescued', said lift-hammock being hung to the edge of the 'rescue barge'; (ii) a front-inflated 'neck-chest harness' to be fastened to the victim, before being lifted onto the 'rescue barge', said 'neck-chest harness' subject to keeping the head side afloat; (iii) the lift-hammock is being secured in a zipped enclosure underneath a water-proof sheath about the 'rescue barge', said enclosure being zipped side ward, and open about the center, and
    (c) the barge about the opposite side is structured to having a storage compartment, securing boat oars, and a solar powered suction device, said suction device clearing swept-in water from a down-sloping corner of the boat interior.

14. The boats of the off-shore rigs as in claim 1 (i), wherein the rig's 'lift-boat' in an air-inflated 'lift-mattress' model, apart from having the general features of a life-boat, having special features needed of its functions, as set forth below
    (a) said 'lift-mattress' model of a lift-boat comprising: (i) a burlap sheathed air-inflated 'lift-mattress' having a wedged configuration in an end-on cut vertical disposition, said burlap sheath having eye-lets, for a rescuer to invert from inside the boat onto the ocean surface; (ii) a minimally concaved side of the lift-mattress conforming to a ramped incline, to be lifting in the 'rescued', and belt-bucking there upon; (iii) yet another concaved side of the lift-mattress steadies the mattress by abutting the side of the boat; (iv) an air-inflated 'receiving mattress' is positioned against the 'rescue side' of the boat interior by the 'rescuer' upon boarding, said receiving mattress about an end-on cut vertical disposition, conforming to a hemi-section of the boat in an end-on vertical disposition,
    (b) for boarding the rescued: (i) the rescuer first slides the head side and then the leg side of the 'rescued' onto the burlap sheathed air-inflated 'receiving mattress' with a ramping incline, wherein the 'rescued' is belt-buckled; (ii) the rescuer then slides the head side and then the leg side of the 'rescued' onto a padded hard-board about the boat interior, said sliding of the rescued helped by the incline of the buckling belts of the 'receiving mattress' and
    (c) the 'lift-mattress' is better elected for existing boats, wherein the mattress structures can be easily appended, whereas the 'hammock model' lift-boat is better constructed as a new boat.

15. A detachable island rig (DIR) of claim 1, wherein the DIR and its basement are designed to be built about the coast line of a natural island, in a near or distant off-shore, by devised structural measures as set forth below
    (a) inhabited or uninhabited natural islands clustering many coast lines are structured to having a land surface about the same level or else slightly higher than sea level, wherein surface demolition of the island coast line effectuating stationing of a submerged DIR basement,
    (b) to start with, the land few yards away from the island coast line is demolished, to build the basement to be far below the sealevel, where after, the surface layers of said few yards of the coast line is demolished, so that the water flows on to the basement submerging it, whereas a conduction platform is built by an extended structuring into the ocean rather than by land demolition,
    (c) as an alternative thereof, a 'modular' basement with wheels and a water filled air capsule is submerged onto a flattened island ground, and a modular DIR locked on to it, wherein the surface layers of the coast line is being demolished soon after the leveled ground is prepared,
    (d) legs from the sea bed are not required of, about the natural island base, whereas in-vicinity oil reservoir is being required of,
    (e) a narrow stump like projectile coast line is being an ideal site, wherein three sides of the rig base are opened to the sea, whereas, about a linear coast line, with a tangential positioning of the rig one widthwise dimension accommodating the steering station, and one lengthwise dimension accommodating the conduction platform are opened to the sea, wherein the conduction platform subject to having a sidewise conjoining with the base, is built by sturdy extended structuring of chosen dimension into the sea, with also the fire-proof corridor accommodated about the sideward conjoining,
    (f) an adjacent terrestrial territory cleared of trees and shrubbery to be not fire-prone, is being amenable for varied purposes, as also accommodating the 'off-site fire escape modular', wherein the 'air tubing' from the rig travel at least for a safe distance in a carved narrow water stream with powerful 'fire-activated' sprinklers jetting water about the terrestrial junction,
    (g) the basement is being steadied by multiple terrestrial anchoring to resist climactic perturbations, and
    (h) in rigs built about greater depths of ocean, greater lengths of the riser and conductor are being feasible, wherein to prevent buckling, the riser-conductor comprising intermittent supports of overlapping metal rods from the solid surface of the adjacent island structures, whereas fluidity of ocean waters is required of, for a well digging and a later well functioning, said fluidity best imparted by electrical heating coils.

* * * * *